United States Patent
Baker et al.

(10) Patent No.: US 9,255,198 B2
(45) Date of Patent: Feb. 9, 2016

(54) WATER SWELLABLE POLYMER MATERIALS COMPRISING PARTICULATE CORE AND WATER SWELLABLE R.A.F.T POLYMER SHELL

(75) Inventors: Matthew P. Baker, Carrum Downs (AU); Timothy W. Davey, Notting Hill (AU); Brian S. Hawkett, Mona Vale (AU); Duc N. Nguyen, Wiley Park (AU); Caitlin C. O'Brien, Mordialloc (AU); Christopher H. Such, Mount Eliza (AU)

(73) Assignee: The University of Sydney, Sydney (AU)

( * ) Notice: Subject to any disclaimer, the term of this patent is extended or adjusted under 35 U.S.C. 154(b) by 481 days.

(21) Appl. No.: 13/513,544

(22) PCT Filed: Dec. 1, 2010

(86) PCT No.: PCT/AU2010/001616
§ 371 (c)(1),
(2), (4) Date: Dec. 17, 2012

(87) PCT Pub. No.: WO2011/066608
PCT Pub. Date: Jun. 9, 2011

(65) Prior Publication Data
US 2013/0087736 A1    Apr. 11, 2013

(30) Foreign Application Priority Data
Dec. 1, 2009    (AU) ................. 2009905865

(51) Int. Cl.
*B32B 5/16*    (2006.01)
*B05D 7/00*    (2006.01)
(Continued)

(52) U.S. Cl.
CPC ............. *C08L 13/02* (2013.01); *C09B 67/0013* (2013.01); *C09C 1/3072* (2013.01);
(Continued)

(58) Field of Classification Search
CPC .......... C09C 3/10; C09D 201/02; C08K 6/36; Y10T 428/2998; Y10T 428/249953
USPC .......... 428/403, 407; 427/212, 221, 336, 373, 427/385.5
See application file for complete search history.

(56) References Cited

U.S. PATENT DOCUMENTS 4,427,836 A    1/1984   Kowalski et al.
4,594,363 A *  6/1986   Blankenship et al. .......... 521/64
(Continued)

FOREIGN PATENT DOCUMENTS

CN        1625571 A    6/2005
WO     WO 01/77198 A1  10/2001
(Continued)

*Primary Examiner* — Holly Le
(74) *Attorney, Agent, or Firm* — Arent Fox LLP

(57) ABSTRACT

The invention provides a method of preparing an aqueous dispersion of polymer encapsulated particulate material, the method comprising:
providing a dispersion of the particulate material in a continuous aqueous phase, the dispersion comprising RAFT agent as a stabiliser for the particulate material; and
polymerising ethylenically unsaturated monomer under the control of the RAFT agent to form polymer at the surface of the dispersed particulate material, thereby providing the aqueous dispersion of polymer encapsulated particulate material;
wherein polymerisation of the ethylenically unsaturated monomer comprises:
(a) polymerising a monomer composition that includes ionisable ethylenically unsaturated monomer so as to form a base responsive water swellable RAFT polymer layer that encapsulates the particulate material; and
(b) polymerising a monomer composition that includes non-ionisable ethylenically unsaturated monomer so as to form an extensible, water and base permeable RAFT polymer layer that encapsulates the base responsive water swellable RAFT polymer layer.

16 Claims, 1 Drawing Sheet

(51) Int. Cl.
*C08L 13/02* (2006.01)
*C09B 67/08* (2006.01)
*C09C 1/30* (2006.01)
*C09C 1/36* (2006.01)
*C09C 1/46* (2006.01)
*C09C 3/10* (2006.01)
*C09D 11/00* (2014.01)
*C09D 113/02* (2006.01)
*B82Y 30/00* (2011.01)

(52) U.S. Cl.
CPC ............. *C09C 1/3676* (2013.01); *C09C 1/46* (2013.01); *C09C 3/10* (2013.01); *C09D 11/00* (2013.01); *C09D 113/02* (2013.01); *B82Y 30/00* (2013.01); *C01P 2004/04* (2013.01); *C01P 2006/60* (2013.01); *Y10S 977/734* (2013.01); *Y10T 428/249953* (2015.04); *Y10T 428/2998* (2015.01)

(56) References Cited

U.S. PATENT DOCUMENTS

| | | | | |
|---|---|---|---|---|
| 4,920,160 | A | * | 4/1990 | Chip et al. ............ 523/201 |
| 5,229,209 | A | * | 7/1993 | Gharapetian et al. ...... 428/403 |
| 5,639,805 | A | * | 6/1997 | Park et al. ............ 523/201 |
| 6,139,961 | A | | 10/2000 | Blankenship et al. |
| 2006/0009546 | A1 | | 1/2006 | Brown |
| 2008/0058457 | A1 | * | 3/2008 | Bompart et al. ............ 524/458 |
| 2009/0162558 | A1 | * | 6/2009 | Bardman et al. ............ 427/384 |
| 2009/0258979 | A1 | * | 10/2009 | Hawkett et al. ............ 524/105 |
| 2010/0056668 | A1 | | 3/2010 | Brown |
| 2010/0227947 | A1 | | 9/2010 | Ganapathiappan et al. |

FOREIGN PATENT DOCUMENTS

| | | |
|---|---|---|
| WO | WO 2006/037161 A1 | 4/2006 |
| WO | WO 2007/112503 A1 | 10/2007 |
| WO | WO 2008/046156 A1 | 4/2008 |
| WO | WO 2010/083569 A1 | 7/2010 |

* cited by examiner

WATER SWELLABLE POLYMER MATERIALS COMPRISING PARTICULATE CORE AND WATER SWELLABLE R.A.F.T POLYMER SHELL

CROSS-REFERENCED TO RELATED APPLICATION

This application is a National Stage entry of International Application PCT/AU2010/001616, filed Dec. 1, 2010, which claims priority to Australian Patent Application No. 2009905865, filed Dec. 1, 2009, each of the disclosures of the prior applications being hereby incorporated in their entirety by reference.

FIELD OF THE INVENTION

The present invention relates in general to water swellable polymer particles, to a method of preparing the same, and to products comprising the water swellable polymer particles. The water swellable polymer particles are particularly suited for use in coating formulations, and it will therefore be convenient to describe the invention with an emphasis toward this application. However, it is to be understood that the water swellable polymer particles may be used in various other applications.

BACKGROUND OF THE INVENTION

Water swellable polymer particles are in general known and have numerous applications. Such particles may be used as a thickening agent for aqueous media, for example as a thickening agent in aqueous coating compositions.

Water swellable polymer particles can also be used as precursors in the formation of polymer particles comprising an internal void(s). Such particles are often referred to in the art as "vesiculated polymer particles", and these too can be employed in a diverse array of applications.

For example, vesiculated polymer particles can be employed as opacifiers in coating compositions such as paints. Opacifiers are important components of paints, having the primary function of scattering light incident on an applied paint film. How well a paint film is able to visually obliterate a surface over which it is applied is referred to as its opacity. Titanium dioxide pigment is traditionally used as the main opacifier in paint formulations and it, together with the polymeric binder of the formulation, are the two main contributors to paint formulation cost. In the formulation of low sheen and flat paints, mineral extender pigments such as calcite, clay or talc are often incorporated in paint formulations to reduce specula reflection down to the desired level.

With the aim of reducing cost, mineral extenders may be added to a paint formulation at such a level that there is insufficient polymeric binder to bind (space fill) all the pigment present. The term "critical pigment concentration" (CPVC) is often used to describe the point where complete space filling can no longer occur. The addition of mineral extender beyond the CPVC can therefore lead to the formation of air voids in the paint film as drying occurs. These voids scatter light in their own right and contribute to paint film opacity thereby allowing an opportunity to reduce the level of titanium dioxide and still achieve acceptable opacity or coverage. The accompanying formula cost saving, however, is at the expense of other paint film properties such as scrub resistance and stain resistance. In the case of stain resistance, the problem is that of stains penetrating into the voids in the film (film porosity).

Vesiculated polymer particles have been used in paint formulations to great effect by providing voids of air in paint films without the disadvantage of film porosity. In addition to providing means to reduce the amount of titanium dioxide required in paint, the use of vesiculated polymer particles can also have the benefit of reducing the amount of polymeric binder solids required to form a well integrated paint film.

Vesiculated polymer particles are often prepared in the form of an aqueous dispersion using suspension and emulsion polymerisation techniques. When in the form of an aqueous dispersion, the voids of the particles are typically filled with water. When such a dispersion is dried, for example as part of a paint formulation applied as a film, the voids of the particles should become filled with air and thus enhance the opacifying properties of the particles.

One approach to preparing vesiculated polymer particles involves first preparing water swellable polymer particles having a core of water swellable polymer and an outer shell or sheath of water permeable and typically non-swellable polymer. The polymer particles are then swollen with water such that the core polymer expands in volume and the shell accommodates this expansion in volume by in essence stretching. The swollen polymer particles can then be dehydrated such that the volume occupied by the swollen core polymer is reduced (i.e. deswells) without a significant reduction in the volume of the stretched shell polymer to thereby afford an internal void within the particle.

Methods used to prepare vesiculated polymer particles in this way are often complex. A particular challenge in preparing the water swellable precursor polymer particles has been to gain sufficient control over the polymerisation process to consistently afford polymer particles having uniform morphology.

Attempts have been made to use conventional free radical polymerisation processes to form water swellable polymer particles that may be used to prepare vesiculated polymer particles. However, such processes are prone to forming polymer particles having a non-uniform shell encapsulating the core water swellable polymer, which can in turn result in rupture of the shell as the core polymer swells thereby resulting in the formation of defective vesiculated polymer particles.

For the efficiency and reliability of products comprising water swellable polymer particles or vesiculated polymer particles formed therefrom, it is generally desirable that the particles are produced with a substantially uniform structure relatively controlled in reproducible manner.

Accordingly, there remains scope for improving on the prior art techniques for preparing water swellable polymer particles that are suitable for use in preparing vesiculated polymer particles, or at the very least to provide an alternative method for preparing such particles. It would also be advantageous to provide water swellable polymer particles with further functionality.

SUMMARY OF THE INVENTION

The present invention provides a method of preparing an aqueous dispersion of polymer encapsulated particulate material, the method comprising:
providing a dispersion of the particulate material in a continuous aqueous phase, the dispersion comprising Reversible Addition-Fragmentation Chain Transfer (RAFT), agent as a stabiliser for the particulate material; and
polymerising ethylenically unsaturated monomer under the control of the RAFT agent to form polymer at the surface of the dispersed particulate material, thereby providing the aqueous dispersion of polymer encapsulated particulate material;

wherein polymerisation of the ethylenically unsaturated monomer comprises:

(a) polymerising a monomer composition that includes ionisable ethylenically unsaturated monomer so as to form a base responsive water swellable RAFT polymer layer that encapsulates the particulate material; and (b) polymerising a monomer composition that includes non-ionisable ethylenically unsaturated monomer so as to form an extensible, water and base permeable RAFT polymer layer that encapsulates the base responsive water swellable RAFT polymer layer.

In another embodiment, the method of the invention further comprises removing from the polymer encapsulated particulate material water within the swollen base responsive water swellable RAFT polymer layer, the effect of which causes the volume of that layer to be reduced, wherein the extensible, water and base permeable RAFT polymer layer remains in a stretched state so as to provide one or more voids in between the particulate material and the stretched extensible, water and base permeable RAFT polymer layer.

The present invention advantageously provides an effective and efficient method of preparing particulate material encapsulated by RAFT polymer layers having properties that collectively enable the polymer encapsulated particulate material to be formed into vesiculated polymer particles where the particulate material is located within the void region.

In particular, the polymer encapsulated particulate material comprises a base responsive water swellable RAFT polymer layer (the "water swellable polymer layer"), and the water swellable layer is encapsulated by an extensible, water and base permeable RAFT polymer layer (the "extensible polymer layer"). The water swellable polymer layer can be swollen with water so as to expand in volume, with the extensible polymer layer stretching to accommodate within its encapsulating confines the expanded volume of the water swellable polymer layer. In its swollen state, the water swellable polymer layer may be simplistically viewed as a relatively concentrated polymer/aqueous solution.

The RAFT polymer layers will generally present as a substantially uniform and continuous encapsulating coating, which in turn facilitates uniform and controlled swelling of the swellable polymer layer with little, if no, rupture of the extensible polymer layer.

Removal from the polymer encapsulated particulate material of water within the swollen polymer layer causes the volume of that layer to contract or be reduced. By the extensible polymer layer remaining in a stretched state, contraction of the swellable polymer layer gives rise to the formation of one or more voids in between the core particulate material and the stretched extensible polymer layer. Such dehydration of the swollen polymer encapsulated particulate material can therefore give rise to vesiculated polymer particles.

However, unlike conventional vesiculated polymer particles, those which can be formed in accordance with the invention comprise particulate material within the void region. Locating particulate material within the void region of vesiculated polymer particles can advantageously give rise to a further interface of the particle that can participate in the scattering of light and thereby enhance the opacifying properties of the vesiculated polymer particles.

The method in accordance with the invention has been found to afford a particular efficient and effective means of producing polymer encapsulated particulate material that can be used to prepare such vesiculated polymer particles having improved opacifying properties.

The mere fact that the polymer encapsulated particulate material contains an internalised particulate material, even in the absence of a void region in between the particulate material and the extensible polymer layer, is also advantageous in its own right. Further detail in relation this is discussed below.

The present invention also provides polymer encapsulated particulate material, the particulate material being encapsulated by a base responsive water swellable RAFT polymer layer comprising polymerised residue of ionisable ethylenically unsaturated monomer, wherein the base responsive water swellable RAFT polymer layer is encapsulated by an extensible, water and base permeable RAFT polymer layer that comprises polymerised residue of non-ionisable ethylenically unsaturated monomer.

In one embodiment, the base responsive water swellable RAFT polymer of the polymer encapsulated particulate material is swollen with water to provide for an expanded volume of that layer, and the extensible, water and base permeable RAFT polymer layer is in a stretched state to accommodate within its confines the expanded volume of the swollen base responsive water swellable RAFT polymer layer.

In another embodiment, water within the swollen base responsive water swellable RAFT polymer layer of the polymer encapsulated particulate material has been removed and the volume of that layer is reduced, and the extensible, water and base permeable RAFT polymer layer remains in a stretched state so as to provide one or more voids in between the particulate material and the stretched, extensible, water and base permeable RAFT polymer layer. In that embodiment, the polymer encapsulated particulate material may be conveniently referred to as a vesiculated polymer particle comprising particulate material within its void region.

Further aspects of the invention appear below in the detailed description of the invention.

BRIEF DESCRIPTION OF THE DRAWINGS

Preferred embodiments of the invention will now be illustrated by way of example only with reference to the accompanying drawings in which.

DETAILED DESCRIPTION OF THE INVENTION

As briefly described above, polymer encapsulated particulate material in accordance with the invention comprises (a) a water swellable polymer layer that encapsulates the particulate material, and (b) an extensible polymer layer that encapsulates the water swellable polymer layer. By exposing the polymer encapsulated particulate material to base in an aqueous medium, the water swellable polymer layer can be triggered to swell with water and expand its volume, with the extensible polymer layer stretching so as to accommodate within its confines the expanded volume of that layer.

Removal of water from the swollen polymer layer will cause the volume of that layer to be reduced, and by maintaining the extensible polymer layer in a stretched state voids can advantageously be formed in between the stretched extensible polymer layer and the particulate material.

Figure 1:
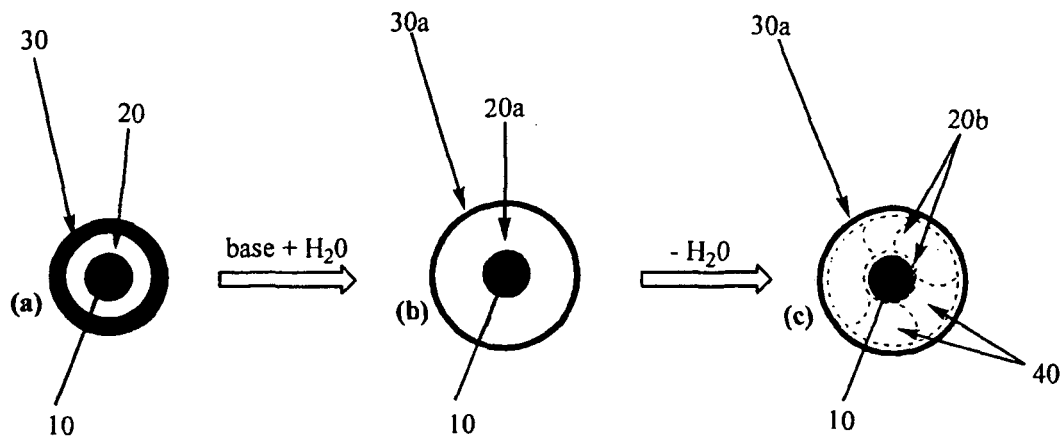
FIG. 1 illustrates a schematic representation of polymer encapsulated particulate material in accordance with the invention.

These various forms of the polymer encapsulated particulate material are schematically illustrated in FIG. 1.

With reference to FIG. 1, a simplified schematic cross section of different forms of the polymer encapsulated particulate material in accordance with the invention are illustrated by parts (a), (b) and (c).

The cross section polymer encapsulated particulate material (a) in FIG. 1 shows the particulate material (10) as a core that is encapsulated by the water swellable RAFT polymer layer (20). The water swellable RAFT polymer layer is itself encapsulated by the extensible RAFT polymer layer (30). The method of the present invention provides for polymer encapsulated particulate material having such features. By exposing polymer encapsulated particulate material (a) to a basic aqueous environment, the water swellable RAFT polymer layer can be triggered to swell with water to afford polymer encapsulated particulate material (b).

The cross section of polymer encapsulated particulate material (b) in FIG. 1 again shows the particulate material (10) encapsulated by the two RAFT polymer layers. However, in this case the water swellable RAFT polymer layer is now swollen with water and has expanded in volume to form a swollen swellable RAFT polymer layer (20a). The extensible RAFT polymer layer has in turn stretched to accommodate within its confines the expanded volume of the swollen polymer layer to form a stretched extensible RAFT polymer layer (30a). Removing water from the swollen RAFT polymer layer affords polymer encapsulated particulate material (c).

The cross section of polymer encapsulated particulate material (c) in FIG. 1 shows one or more voids (40) that have formed as a result of water being removed from the swollen polymer layer and its volume being correspondingly reduced. Without wishing to be limited by theory, it is believed that the dehydrated water swellable RAFT polymer layer (20b) may form on the inner surface of the stretched extensible RAFT polymer layer (30a) and/or the outer surface of the particulate material (10). It may also be that dehydrated water swellable polymer residue extends across the void(s) between the particulate material and stretched extensible RAFT polymer layer. Irrespective of where the dehydrated water swellable RAFT polymer layer residue resides, one or more voids are advantageously formed between the particulate material and the stretched extensible RAFT polymer layer. Such polymer encapsulated particulate material may therefore be conveniently referred to as a vesiculated polymer particle. As will be appreciated from FIG. 1(c), the particulate material is advantageously located within the void region of the vesiculated polymer particle. Locating the particulate material in this manner can advantageously enhance the opacifying properties of the vesiculated polymer particle.

It will be appreciated that in order to maximise the impact of the void on the scattering of light by the core particle it is desirable to minimise the amount of water swellable polymer used to achieve a void of given volume. This will minimise the contribution that the water swellable polymer remaining in the void makes to the refractive index of that void and maximise the refractive index difference between the void and the core particle.

The method in accordance with the invention comprises providing a dispersion of the particulate material in a continuous aqueous phase. The dispersion may therefore be described simplistically as an aqueous phase having the particulate material dispersed therein. In this context, the term "phase" is used to convey that there is an interface between the aqueous media and the particulate material as a result of the particulate material being substantially insoluble in the aqueous media.

It will be appreciated that in isolation the aqueous phase will typically be an aqueous liquid medium. In other words, the term "phase" simply assists with describing the aqueous media when provided in the form of the dispersion. However, for convenience the aqueous media used to prepare the dispersion may hereinafter simply be referred to as the aqueous phase.

The "particulate material" used in accordance with the invention will typically be solid in composition at least at temperatures used to prepare the polymer encapsulated particulate material. Where vesiculated polymer particles are to be prepared from the polymer encapsulated particulate material, the particulate material will typically also be solid in composition in the sense that it must provide an interface when located within the void region of vesiculated polymer particles.

Provided that the particulate material can be dispersed in the continuous aqueous phase, there is no particular limitation concerning its shape, size or composition. However, those skilled in the art will appreciate that particulate material having a high aspect ratio, for example those having a flat lamellar or needle shape, may prove more difficult to uniformly encapsulate with polymer than particulate material having a relatively low aspect ratio.

The particulate material may be in the form of primary particles, or in the form of an aggregation of primary particles. The method of the invention is particularly effective at preparing polymer encapsulated primary particulate material.

Generally, the largest dimension of the particulate material (as a primary particle or aggregation of primary particles) will be no greater than about 10 microns, or no greater than about 5 microns, or no greater than about 1 micron. The method of the invention is particularly effective at preparing polymer encapsulated sub-micron particulate material, for example where the largest dimension of the particulate material is no greater than about 0.5 microns, no greater than about 0.25 microns, no greater than about 0.1 micron, no greater than about 0.01 micron, or no greater than about 0.001 micron.

Unless stated otherwise, reference herein to the size of particles or particulate material is intended to be a reference to the average largest dimension of the particles or particulate material as measured by optical microscopy for sizes above about 1 micron, and by TEM for sizes below about 1 micron.

The particulate material may be a pigment, magnetic material, fullerene, or a combination thereof.

The pigment may be an inorganic material selected from titanium oxide, zinc oxide, calcium carbonate, ion oxide, silicon dioxide, barium sulphate, carbon black and combinations thereof. The pigment may be an organic pigment such as phthalocyanine blue, phthalocyanine green, quinacridone, dibromananthrone and combinations thereof.

The fullerene may be selected from carbon nanotubes, buckyballs and combinations thereof.

In one embodiment, the particulate material is non-polymeric particulate material.

In a further embodiment, the particulate material is hydrophilic in character (i.e. can be wetted by a hydrophilic liquid). Examples of such materials include, but are not limited to, titanium dioxide, zinc oxide, calcium carbonate, iron oxide, silicon dioxide, barium sulfate, and magnetic materials such as γ-iron oxide.

The particulate material is dispersed in a continuous aqueous phase. This phase will of course be made up of water, but may also comprise one or more water miscible polar solvents such as ethylene and propylene glycol and low molecular weight alcohols (e.g. $C_1$-$C_3$ alcohols).

As will be discussed in more detail below, in order to form the encapsulating polymer layers the continuous aqueous phase will also comprise one or more ethylenically unsaturated monomers. These monomers may present in the aqueous phase as a separate liquid phase (i.e. a separate immiscible liquid phase), or the monomers may be soluble in the aqueous phase.

The continuous aqueous phase may also comprise one or more additives, such as those used to regulate or adjust pH.

An important feature of the method of the invention is that the dispersion comprise RAFT agent as a stabiliser for the particulate material. By functioning as "a stabiliser", the RAFT agent serves to prevent, or at least minimise coalescence or aggregation of the dispersed particulate material. As a stabiliser, the RAFT agent may prevent, or at least minimise, coalescence or aggregation of the particulate material through well known pathways such as steric and/or electrostatic repulsion. To provide the ability to function as a stabiliser, the RAFT agent comprises a moiety that can provide for the requisite steric and/or electrostatic repulsion.

By functioning as a stabiliser in the manner described above, RAFT agent used in accordance with the invention can also advantageously stabilise the polymer encapsulated particulate material formed in accordance with the invention and thereby prevent, or at least minimise coalescence or aggregation of those particles as well.

Those skilled in the art will appreciate that the RAFT agent therefore functions in a similar manner to conventional surfactants that are commonly used to prepare dispersions in emulsion polymerisation techniques.

By providing the function of a stabiliser, the RAFT agent used in accordance with the invention can advantageously be used in place of conventional stabilisers or surfactants. In other words, the method in accordance with the invention can advantageously be performed without conventional surfactants.

Having said this, the method can be performed using a co-stabiliser, such as a conventional stabiliser. However, in that case it is preferred that such a co-stabiliser is used in an amount below the stabilisers critical micelle concentration (CMC). As will be discussed in more detail below, the presence of stabiliser in the continuous aqueous phase that is not associated with stabilising the polymer particles can give rise to the formation of polymer particles in the continuous aqueous phase that do not contain the particulate material.

Nevertheless, when a dispersion of polymer particles, or product prepared therefrom is, for example, applied to a substrate surface and dries to form a film, as with a paint, conventional stabilisers in the dispersion can tend to migrate to the surface and localise in pockets, thereby adversely affecting the surface properties of the film, particularly in the area of water sensitivity.

Accordingly, in one embodiment the method of the invention is performed without using a stabiliser other than the RAFT agent. The polymer encapsulated particulate material in accordance with the invention may therefore also comprise no stabiliser other than the RAFT agent.

As will be discussed in more detail below, conventional RAFT agents do not generally possess the properties to function as a stabiliser. Such properties are by in large derived from the molecular structure of a given RAFT agent, and that molecular structure typically needs to be specifically designed so as to afford the ability to function as a stabiliser.

In addition to the RAFT agent functioning as a stabiliser, in accordance with the method of the invention ethylenically unsaturated monomer is polymerised under the control of the RAFT agent. By the monomers being polymerised "under the control of the RAFT agent" is meant that the monomers are polymerised via a Reversible Addition-Fragmentation Chain Transfer (RAFT) mechanism to form polymer. Polymer formed by this mechanism is referred to herein as "RAFT polymer".

RAFT polymerisation of ethylenically unsaturated monomer is described in WO 98/01478, and in effect is a radical polymerisation technique that enables polymers to be prepared having a well defined molecular architecture and low polydispersity. Those skilled in the art are well versed with RAFT agents and their use in the polymerisation of ethylenically unsaturated monomers to form RAFT polymers.

Unlike conventional RAFT agents, RAFT agents used in accordance with the method of the invention function to control the polymerisation of ethyl lenically unsaturated monomers and also function as a stabiliser for particulate material. By virtue of this dual function, monomer can advantageously be polymerised to form polymer at the surface of the dispersed particulate material. The polymer so formed gives rise to the water swellable and extensible polymer layers.

By polymer being formed "at the surface" of the dispersed particulate material is meant that polymer forms at least initially on or immediately adjacent the outer most surface of the particulate material. In other words, polymer forms at the interface between the particulate material and the continuous aqueous phase (i.e. not within the particulate material) such that it can coat and encapsulate the particulate material.

By functioning as a stabiliser, the RAFT agent used in accordance with the invention will be capable of physically associating in some way with the outer most surface of the particulate material. For example, the physical association between the RAFT agent and the particulate material may be by way of the RAFT agent being adsorbed onto the outer most surface of the particulate material. By having an ability to be adsorbed onto the outer most surface of the particulate material, it will be appreciated that the RAFT agent will exhibit surface activity, or in another words it will be surface active. By being adsorbed onto rather than being anchored to the outer most surface of the particulate material, the RAFT agent can exhibit a degree of lability and is therefore less prone to become enveloped by polymer that is formed at the surface of the particle. In other words, an adsorbed RAFT agent can have the ability to move away from the surface of the particulate material with the polymer as it is being formed.

RAFT agents used in accordance with the invention will typically have a structure that enables them to (a) be preferentially adsorbed onto the outer most surface of the particulate material rather than be solvated by and present in the continuous aqueous phase, (b) function as a stabiliser for the particulate material under the conditions of the polymerisation, and (c) control polymerisation of ethylenically unsaturated monomers.

RAFT agents suitable for use in accordance with the invention include those of general formula (1):

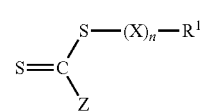

(1)

where each X is independently a polymerised residue of an ethylenically unsaturated monomer, n is an integer ranging from 0 to 100, or from 5 to 100, or from 10 to 100, or from 0 to 60, or from 5 to 60, or from 10 to 60, or from 1 to 40, or from 5 to 40, or from 10 to 40, $R^1$ and Z are groups independently selected such that the agent can function as a RAFT agent in the polymerisation of the selected one or more ethylenically unsaturated monomers.

In order to function as a RAFT agent in the polymerisation of the ethylenically unsaturated monomers, those skilled in the art will appreciate that $R^1$ will typically be an organic group and, in combination with the —$(X)_n$— group (i.e. as $R^1$—$(X)_n$—), will function as a free radical leaving group under the polymerisation conditions employed and yet, as a free radical leaving group, retain the ability to reinitiate polymerisation. Similarly, those skilled in the art will appreciate that Z will typically be an organic group which functions to give a suitably high reactivity of the C=S moiety in the RAFT agent towards free radical addition without slowing the rate of fragmentation of the RAFT-adduct radical to the extent that polymerisation is unduly retarded.

To afford the required stabilising properties, RAFT agents of general formula (1) will generally be selected to have groups, sections or regions (hereinafter simply referred to as "sections") with hydrophilic and hydrophobic properties. These sections will be provided collectively by the Z, $(X)_n$ and $R^1$ groups of the agent. The hydrophilic and hydrophobic sections of the agent may be discretely arranged as in a block-type structure, or they may be arranged in a less ordered way as in a random-, tapered- or alternating-type structure.

In one embodiment, RAFT agent used in accordance with the invention is sufficiently hydrophilic in character (overall) such that it is soluble in the aqueous phase in which the polymerisation is to be performed. Such a RAFT agent may be conveniently referred to herein as a "hydrophilic RAFT agent". Thus, a "hydrophilic RAFT agent" used in accordance with the invention is intended to mean a RAFT agent that is soluble in the continuous aqueous phase in which the polymerisation of the ethylenically unsaturated monomers is performed.

In one embodiment, the hydrophilic RAFT agents are selected such that they are not capable of forming micelles (or aggregates) within the continuous aqueous phase.

Hydrophilic RAFT agents of general formula (1) may derive their hydrophilic character through the selection of appropriate Z, $(X)_n$ and/or $R^1$ groups of the agent.

For example, a hydrophilic RAFT agent general formula (1) may derive its hydrophilic character by varying the nature of the $(X)_n$ group. In that case, each X may independently be a polymerised residue of a hydrophilic ethylenically unsaturated monomer. The group —$(X)_n$— may be a homopolymer or a copolymer such as a block or random copolymer.

Through variation of the types of hydrophilic monomers used (e.g. types of functional groups, ionisable or non-ionisable, etc), and/or the manner in which they are polymerised (e.g. to form a homopolymer or copolymer), the hydrophilic character of the RAFT agent can advantageously be tailored to suit a particular application.

The —$(X)_n$— group may also comprise the polymerised residue of one or more hydrophobic ethylenically unsaturated monomers, provided that the overall hydrophilic character of the RAFT agent is maintained. Examples of a suitable hydrophilic and hydrophobic monomers may be used to form the —$(X)_n$— group are described below.

In terms of a hydrophilic RAFT agent general formula (1) for use in accordance with the invention, the group represented by $R^1$ may be selected such that it is either hydrophilic or hydrophobic in character. However, the $R^1$ group can of course only be hydrophobic provided it does not prevent the RAFT agent from being overall hydrophilic in character.

Generally, $R^1$ is selected such that it is hydrophilic in character. Due to $R^1$ being somewhat removed from the thiocarbonylthio group, its role in modifying the reactivity of the hydrophilic RAFT agent becomes limited as n increases. However, it is important that the group —$(X)_n$—$R^1$ of formula (1), is a free radical leaving group that is capable of re-initiating polymerisation.

The selection of Z is typically more important with respect to providing the RAFT agent with the ability to gain control over the polymerisation. In selecting a Z group for compounds of formula (1) it is important that such a group does not provide a leaving group that is a better leaving group in comparison with the —$(X)_n$—$R^1$ group of formula (1). By this limitation, monomer insertion preferentially occurs between —$(X)_n$—$R^1$ and its nearest sulfur atom. This will of course not be relevant if the Z group is also an —$(X)_n$—$R^1$ group.

In terms of a hydrophilic RAFT agent general formula (1) for use in accordance with the invention, the group represented by Z may be selected such that it is either hydrophilic or hydrophobic in character. However, the Z group can of course only be hydrophobic provided it does not prevent the RAFT agent from being overall hydrophilic in character.

The terms "hydrophilic" and "hydrophobic" have and will be used herein to describe the character or properties of certain features of the present invention. Those skilled in the art will appreciate that these terms are typically used as an indicator of favourable or unfavourable interactions of one substance relative to another (i.e. attractive or repulsive interactions) and not to define absolute qualities of a particular substance. In other words, the terms "hydrophilic" and "hydrophobic" are used as primary indicators to define characteristics such as like attracting like and unlike repelling unlike.

Thus, it will be appreciate that hydrophilic character is intended to indicated a favourable interaction (e.g. good solubility or wettability) with aqueous media, whereas hydrophobic character is intended to indicated an unfavourable interaction with aqueous media (e.g. poor solubility or wettability).

Bearing in mind the discussion above on selecting RAFT agents to function as a stabiliser for the particulate material and to also control the polymerisation of ethylenically unsaturated monomer, $R^1$ and Z of formula (1) will generally each be an optionally substituted organic group.

In one embodiment $R^1$ is an optionally substituted organic group selected from alkyl, alkenyl, alkynyl, aryl, acyl, carbocyclyl, heterocyclyl, heteroaryl, alkyloxy, alkenyloxy, alkynyloxy, aryloxy, acyloxy, carbocyclyloxy, heterocyclyloxy, heteroaryloxy, alkylthio, alkenylthio, alkynylthio, arylthio, acylthio, carbocyclylthio, heterocyclylthio, heteroarylthio, alkylalkenyl, alkylalkynyl, alkylaryl, alkylacyl, alkylcarbocyclyl, alkylheterocyclyl, alkylheteroaryl, alkyloxyalkyl, alkenyloxyalkyl, alkynyloxyalkyl, aryloxyalkyl, alkylacyloxy, alkylcarbocyclyloxy, alkylheterocyclyloxy, alkylheteroaryloxy, alkylthioalkyl, alkenylthioalkyl, alkynylthioalkyl, arylthioalkyl, alkylacylthio, alkylcarbocyclylthio, alkylheterocyclylthio, alkylheteroarylthio, alkylalkenylalkyl, alkylalkynylalkyl, alkylarylalkyl, alkylacylalkyl, arylalkylaryl, arylalkenylaryl, arylalkynylaryl, arylacylaryl, arylacyl, arylcarbocyclyl, arylheterocyclyl, arylheteroaryl, alkenyloxyaryl, alkynyloxyaryl, aryloxyaryl, arylacyloxy, arylcarbocyclyloxy, arylheterocyclyloxy, arylheteroaryloxy, alkylthioaryl, alkenylthioaryl, alkynylthioaryl, arylthioaryl, arylacylthio, arylcarbocyclylthio, arylheterocyclylthio, and arylheteroarylthio.

In a further embodiment $R^1$ is an optionally substituted organic group selected from $C_1$-$C_{18}$ alkyl, $C_2$-$C_{18}$ alkenyl, $C_2$-$C_{18}$ alkynyl, $C_6$-$C_{18}$ aryl, $C_1$-$C_{18}$ acyl, $C_3$-$C_{18}$ carbocyclyl, $C_2$-$C_{18}$ heterocyclyl, $C_3$-$C_{18}$ heteroaryl, $C_1$-$C_{18}$ alkyloxy, $C_2$-$C_{18}$ alkenyloxy, $C_2$-$C_{18}$ alkynyloxy, $C_6$-$C_{18}$ aryloxy, $C_1$-$C_{18}$ acyloxy, $C_3$-$C_{18}$ carbocyclyloxy, $C_2$-$C_{18}$ heterocyclyloxy, $C_3$-$C_{18}$ heteroaryloxy, $C_1$-$C_{18}$ alkylthio, $C_2$-$C_{18}$ alkenylthio, $C_2$-$C_{18}$ alkynylthio, $C_6$-$C_{18}$ arylthio, $C_1$-$C_{18}$ acylthio, $C_3$-$C_{18}$ carbocyclylthio, $C_2$-$C_{18}$ heterocyclylthio, $C_3$-$C_{18}$ heteroarylthio, $C_3$-$C_{18}$ alkylalkenyl, $C_3$-$C_{18}$ alkylalkynyl, $C_7$-$C_{24}$ alkylaryl, $C_2$-$C_{18}$ alkylacyl, $C_4$-$C_{18}$ alkylcarbocyclyl, $C_3$-$C_{18}$ alkylheterocyclyl, $C_4$-$C_{18}$ alkylheteroaryl, $C_2$-$C_{18}$ alkyloxyalkyl, $C_3$-$C_{18}$ alkenyloxyalkyl, $C_3$-$C_{18}$ alkynyloxyalkyl, $C_7$-$C_{24}$ aryloxyalkyl, $C_2$-$C_{18}$ alkylacyloxy, $C_4$-$C_{18}$ alkylcarbocyclyloxy, $C_3$-$C_{18}$ alkylheterocyclyloxy, $C_4$-$C_{18}$ alkylheteroaryloxy, $C_2$-$C_{18}$ alkylthioalkyl, $C_3$-$C_{18}$ alkenylthioalkyl, $C_3$-$C_{18}$ alkynylthioalkyl, $C_7$-$C_{24}$ arylthioalkyl, $C_2$-$C_{18}$ alkylacylthio, $C_4$-$C_{18}$ alkylcarbocyclylthio, $C_3$-$C_{18}$ alkylheterocyclylthio, $C_4$-$C_{18}$ alkylheteroarylthio, $C_4$-$C_{18}$ alkylalkenylalkyl, $C_4$-$C_{18}$ alkylalkynylalkyl, $C_8$-$C_{24}$ alkylarylalkyl, $C_3$-$C_{18}$ alkylacylalkyl, $C_{13}$-$C_{24}$ arylalkylaryl, $C_{14}$-$C_{24}$ arylalkenylaryl, $C_{14}$-$C_{24}$ arylalkynylaryl, $C_{13}$-$C_{24}$ arylacylaryl, $C_7$-$C_{18}$ arylacyl, $C_9$-$C_{18}$ arylcarbocyclyl, $C_8$-$C_{18}$ arylheterocyclyl, $C_9$-$C_{18}$ arylheteroaryl, $C_8$-$C_{18}$ alkenyloxyaryl, $C_8$-$C_{18}$ alkynyloxyaryl, $C_{12}$-$C_{24}$ aryloxyaryl, $C_7$-$C_{18}$ arylacyloxy, $C_9$-$C_{18}$ arylcarbocyclyloxy, $C_8$-$C_{18}$ arylheterocyclyloxy, $C_9$-$C_{18}$ arylheteroaryloxy, $C_7$-$C_{18}$ alkylthioaryl, $C_8$-$C_{18}$ alkenylthioaryl, $C_8$-$C_{18}$ alkynylthioaryl, $C_{12}$-$C_{24}$ arylthioaryl, $C_7$-$C_{18}$ arylacylthio, $C_9$-$C_{18}$ arylcarbocyclylthio, $C_8$-$C_{18}$ arylheterocyclylthio, and $C_9$-$C_{18}$ arylheteroarylthio.

In another embodiment $R^1$ is an optionally substituted organic group selected alkyl and alkylaryl.

Examples of optional substituents for $R^1$ include —$CO_2H$, —$CO_2RN$, —$SO_3H$, —$OSO_3H$, —$SORN$, —$SO_2RN$, —$OP(OH)_2$, —$P(OH)_2$, —$PO(OH)_2$, —$OH$, —$ORN$, —$(OCH_2$—$CHR)_w$—$OH$, —$CONH_2$, $CONHR'$, $CONR'R''$, —$NR'R''$, —$N^+R'R''R'''$, where R is selected from $C_1$-$C_6$ alkyl, w is 1 to 10, R', R" and R''' are independently selected from alkyl (e.g. $C_1$-$C_6$ alkyl) and aryl (e.g. $C_6$-$C_{18}$ aryl), which are optionally substituted with one or more hydrophilic groups selected from —$CO_2H$, —$SO_3H$, —$OSO_3H$, —$OH$, —$(COCH_2CHR)_w$—$OH$, —$CONH_2$, —$SOR$ and —$SO_2R$, and salts thereof, where R and w are as defined above.

In a further embodiment $R^1$ is an organic group selected from $C_1$-$C_6$ alkyl, $C_7$-$C_{24}$ aryloxyalkyl, $C_4$-$C_{18}$ alkylheteroaryloxy, each of which is substituted with one or more hydrophilic groups selected from —$CO_2H$, —$CO_2RN$, —$SO_3H$, —$OSO_3H$, —$SORN$, —$SO_2RN$, —$OP(OH)_2$, —$P(OH)_2$, —$PO(OH)_2$, —$OH$, —$ORN$, —$(OCH_2$—$CHR)_w$—$OH$, —$CONH_2$, $CONHR'$, $CONR'R''$, —$NR'R''$, —$N^+R'R''R'''$, where R is selected from $C_1$-$C_6$ alkyl, w is 1 to 10, R', R" and R''' are independently selected from alkyl (e.g. $C_1$-$C_6$ alkyl) and aryl (e.g. $C_6$-$C_{18}$ aryl), which are optionally substituted with one or more hydrophilic groups selected from —$CO_2H$, —$SO_3H$, —$OSO_3H$, —$OH$, —$(COCH_2CHR)_w$—$OH$, —$CONH_2$, —$SOR$ and —$SO_2R$, and salts thereof, where R and w are as defined above.

Where the hydrophilic group selected is —$N^+R'R''R'''$, there will of course be an associated counter anion.

In another embodiment $R^1$ is —$CH(CH_3)CO_2H$, —$CH(CO_2H)CH_2CO_2H$, and —$C(CH_3)_2CO_2H$.

In one embodiment Z is an optionally substituted organic group selected from alkoxy, aryloxy, alkyl, aryl, heterocyclyl, arylalkyl, alkylthio, arylalkylthio, dialkoxy- or diaryloxy-phosphinyl [—$P(=O)OR^2{}_2$], dialkyl- or diaryl-phosphinyl [—$P(=O)R^2{}_2$], acylamino, acylimino, amino, $R^1$—$(X)_n$—S— and a polymer chain formed by any mechanism, for example polyalkylene oxide polymers such as water soluble polyethylene glycol or polypropylene glycol, and alkyl end capped derivatives thereof, where $R^1$, X and n are as defined above and $R^2$ is selected from alkyl, alkenyl, aryl, heterocyclyl, and alkylaryl.

In a further embodiment Z is an optionally substituted organic group selected from $C_1$-$C_{20}$ alkoxy, $C_6$-$C_{20}$ aryloxy, $C_1$-$C_{20}$ alkyl, $C_6$-$C_{20}$ aryl, $C_3$-$C_{20}$ heterocyclyl, $C_7$-$C_{20}$ arylalkyl, $C_1$-$C_{20}$ alkylthio, $C_7$-$C_{20}$ arylalkylthio, dialkoxy- or diaryloxy-phosphinyl [—$P(=O)OR^2{}_2$], dialkyl- or diaryl-phosphinyl [—$P(=O)R^2{}_2$], $C_1$-$C_{20}$ acylamino, $C_1$-$C_{20}$ acylimino, $C_0$-$C_{20}$ amino, and $R^1$—$(X)_n$—S—, where $R^1$, X and n are as defined above and $R^2$ is selected from $C_1$-$C_{18}$ alkyl, $C_2$-$C_{18}$ alkenyl, $C_2$-$C_{18}$ alkynyl, $C_6$-$C_{18}$ aryl, $C_2$-$C_{18}$ heterocyclyl, and $C_7$-$C_{24}$ alkylaryl.

In another embodiment Z is an optionally substituted organic group selected from —$CH_2(C_6H_5)$, $C_1$-$C_{20}$ alkyl,

where e is 2 to 4, and —$SR^3$, where $R^3$ is selected from $C_1$ to $C_{20}$ alkyl.

For avoidance of doubt, the nomenclature "$C_x$-$C_y$ [group]" is intended to mean that the [group], whether substituted or not, has a total number of carbon atoms in the range $C_x$-$C_y$.

In the lists above defining groups from which $R^1$ or Z may be selected, each alkyl, alkenyl, alkynyl, aryl, carbocyclyl, heteroaryl, and heterocyclyl moiety may be optionally substituted. For avoidance of any doubt, where a given $R^1$ or Z group contains two or more of such moieties (e.g. alkylaryl), each of such moieties may be optionally substituted with one, two, three or more optional substituents as herein defined.

In the lists above defining groups from which $R^1$ or Z may be selected, where a given $R^1$ or Z group contains two or more subgroups (e.g. [group A][group B]), the order of the subgroups is not intended to be limited to the order in which they are presented. Thus, an $R^1$ or Z group with two subgroups defined as [group A][group B] (e.g. alkylaryl) is intended to also be a reference to an $R^1$ or Z with two subgroups defined as [group B][group A] (e.g. arylalkyl).

Each X in general formula (1) is independently a polymerised residue of an ethylenically unsaturated monomer. As indicated above, RAFT agents of used in accordance with the invention will generally be selected such that —$(X)_n$— comprises the polymerised residue of hydrophilic and hydrophobic monomers.

In one embodiment, —$(X)_n$— comprises the polymerised residue of hydrophilic ethylenically unsaturated monomers.

In a further embodiment, —$(X)_n$— comprises the polymerised residue of ionisable ethylenically unsaturated monomers.

Where —$(X)_n$— comprises the polymerised residue of ionisable ethylenically unsaturated monomer, adjusting the pH of the aqueous phase when performing the method of the invention can promote ionisation of at least some of the ionisable residues, which in turn can assist with rendering the RAFT agent hydrophilic (i.e. assist with making the RAFT agent soluble in the aqueous phase).

In one embodiment, n of the —$(X)_n$— ranges from 5 to 40.

In one embodiment, —$(X)_n$— comprises the polymerised residue of ionisable ethylenically unsaturated monomers selected from acrylic acid, methacrylic acid, sodium styrene sulphonate, and combinations thereof, and optionally the polymerised residue of one or more (meth)acrylate ester monomers.

In another embodiment, —(X)$_n$— is a random copolymer comprising the polymerised residue of about 10 acrylic acid units, about 5 butyl acrylate units, and 5 sodium styrene sulphonate units.

In a further embodiment, —(X)$_n$— is a copolymer comprising as a block the polymerised residue of about 10 acrylic acid units, and as a random copolymer the polymerised residue of about 10 acrylic acid units, 5 butyl acrylate units, and 10 sodium styrene sulphonate units.

Further detail in relation to hydrophilic, hydrophobic, ionisable and non-ionisable ethylenically unsaturated monomers is provided below.

More specific examples of RAFT agents of general formula (1) include, but are not limited to, agents represented by the following general formulas 2 to 11:

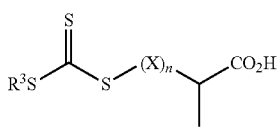

(2)

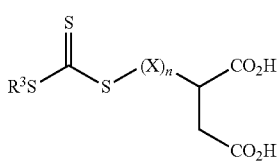

(3)

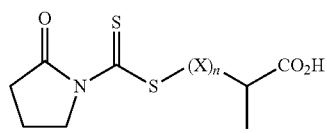

(4)

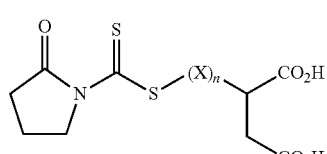

(5)

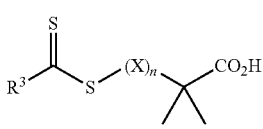

(6)

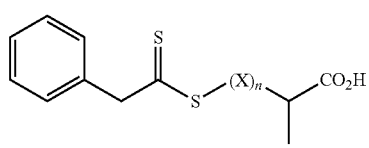

(7)

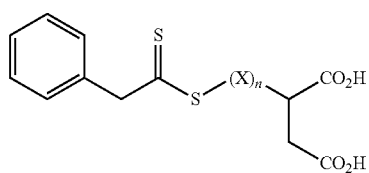

(8)

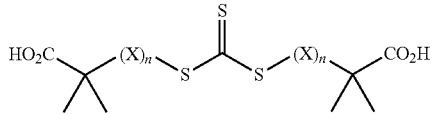

(9)

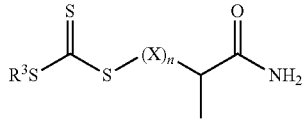

(10)

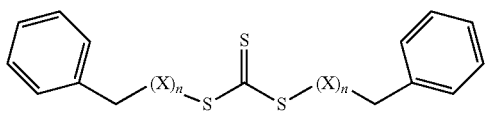

(11)

where R$^3$, X and n are as previously defined.

In one embodiment, the RAFT agent of general formula (1) used in accordance with the invention is a trithiocarbonyl RAFT agent.

Depending upon the nature of the particulate material, the continuous aqueous phase and the RAFT agent, it may be that prior to the formation of polymer at the surface of the particulate material, a RAFT agent, although acting as a stabiliser, may exhibit a degree of lability. By a RAFT agent exhibiting a degree of "lability" is meant that the agent can exist in an equilibrium between being solvated in the continuous aqueous phase and being associated at the surface of the particulate material. For convenience, a RAFT agent that is not associated with the particulate material in the continuous aqueous phase will herein be referred to as "free" RAFT agent.

The presence of free RAFT agent (or conventional stabiliser/surfactant) in the continuous aqueous phase may lead to the formation of independent polymer particles that do not comprise particulate material. It will be appreciated that provided a labile RAFT agent gains control of polymerisation at the surface of the particulate material, this polymerisation process itself will inevitably render the agent non-labile. Also, the pH of the aqueous phase can have an influence on the solubility, and hence the lability, of the agent.

To minimise the formation independent polymer particles that do not comprise particulate material, the ethylenically unsaturated monomers can be introduced to the continuous aqueous phase after the particulate material and RAFT agent interact so as to provide for a stable dispersion. By adopting this approach, the likelihood of any RAFT agent also acting as a stabiliser for monomer droplets in the continuous liquid phase is reduced. It is also preferred that the monomer which is introduced to the continuous aqueous phase is done in a manner that avoids the formation of monomer droplets. In other words, it is preferred that the polymerisation is conducted under "starved feed" conditions. Such conditions also reduce the likelihood of stabilised monomer droplets being formed in the continuous aqueous phase, which in turn also reduces the possibility of forming polymer that is independent of the particulate material.

Where it is desirable to minimise the possibility of forming polymer that is independent of the particulate material, the polymerisation may be conducted to a point where substantially all labile RAFT agent present has been rendered non-labile. At this point, the "lightly" polymer encapsulated particulate material may be separated from any independent polymer particles that may have formed or any residual free RAFT agent by a separation method such as centrifugation. The "lightly" polymer encapsulated particulate material can then be redispersed in a continuous aqueous phase with monomer and the polymerisation continued to form a thicker polymer coating on the particulate material.

Minimising, or avoiding all together, the use of stabilisers other than the RAFT agent can also assist with the reducing the formation independent polymer particles that do not comprise particulate material.

In accordance with the method of the invention, ethylenically unsaturated monomers are polymerised under the control of the RAFT agent to form a polymer at the surface of the particulate material. The polymerisation will usually require initiation from a source of free radicals. The source of initiating radicals can be provided by any suitable method of generating free radicals, such as the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X- or gamma-radiation. The initiating system is chosen such that under the reaction conditions there is no substantial adverse interaction of the initiator or the initiating radicals with the RAFT agent under the conditions of the reaction.

Thermal initiators are chosen to have an appropriate half life at the temperature of polymerisation. These initiators cane include one or more of the following compounds:
2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis {2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine)dihydrochloride, 2,2'-azobis(2-amidinopropane)dihydrochloride, 2,2'-azobis (N,N'-dimethyleneisobutyramidine), 2,2'-azobis{2-methyl-N-[1,1-bis(hydroxymethyl)-2-hydroxyethyl] propionamide}, 2,2'-azobis{2-methyl-N-[1,1-bis (hydroxymethyl)-2-ethyl]propionamide}, 2,2'-azobis [2-methyl-N-(2-hydroxyethyl)propionamide], 2,2'-azobis(isobutyramide)dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. This list is not exhaustive.

Photochemical initiator systems are chosen to have the requisite solubility in the reaction medium and have an appropriate quantum yield for radical production under the conditions of the polymerisation. Examples include benzoin derivatives, benzophenone, acyl phosphine oxides, and photo-redox systems.

Redox initiator systems are chosen to have the requisite solubility in the reaction medium and have an appropriate rate of radical production under the conditions of the polymerisation; these initiating systems can include, but are not limited to, combinations of the following oxidants and reductants:
oxidants: potassium, peroxydisulfate, hydrogen peroxide, t-butyl hydroperoxide.
reductants: iron (II), titanium (III), potassium thiosulfite, potassium bisulfite.

Other suitable initiating systems are described in recent texts. See, for example, Moad and Solomon "the Chemistry of Free Radical Polymerisation", Pergamon, London, 1995, pp 53-95.

Initiators having an appreciable solubility in an aqueous medium include, but are not limited to, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine)dihydrochloride, 2,2'-azobis (2-amidinopropane)dihydrochloride, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide)dihydrate, and derivatives thereof.

Initiators having an appreciable solubility in a hydrophobic medium include, but are not limited to, azo compounds exemplified by the well known material 2,2'-azobisisobutyronitrile and 2,2'-azobis(2-methylbutyronitrile). Other readily available initiators are acyl peroxides such as acetyl and benzoyl peroxide as well as alkyl peroxides such as cumyl and t-butyl peroxides. Hydroperoxides such as t-butyl and cumyl hydroperoxides may also be used.

Preferred initiators include, but are not limited to, 2,2'-azobisisobutyronitrile and 2,2'-azobis(2-methylbutyronitrile).

It is preferable that polymerisation of the monomers is maintained under the control of the RAFT agent throughout the entire polymerisation. However, provided that the water swellable polymer layer and the extensible polymer layer are formed under the control of the RAFT agent, monomer may also be polymerised by other free radical pathways. Having said this, it will be appreciated that as the amount of monomer polymerised under the control of the RAFT agent decreases, the propensity for irregular growth and the formation of polymer in one reaction site only increases. The amount of monomer that may be polymerised by other free radical pathways in a given reaction sequence will to a large extent depend upon the intended application for the polymer encapsulated particles.

Evidence as to whether the polymerisation reaction has proceeded, at least in part, under the control of a RAFT agent may be obtained by a simple visual assessment (for example by Transmission Electron Microscopy) of the polymer layers formed around the particulate material. Significant loss of "RAFT control" will be characterised by an irregular non-uniform polymer layers, whereas polymerisation under the control of the RAFT agent provides for regular and uniform polymer layers.

The composition and architecture of the polymer layers formed around the particulate material may be tailored through the selection and controlled addition of monomer. A wide range of ethylenically unsaturated monomers may be used in accordance with the method of the invention. Suitable monomers are those which can be polymerised by a free radical process. The monomers should also be capable of being polymerised with other monomers. The factors which determine copolymerisability of various monomers are well documented in the art. For example, see: Greenlee, R. Z., in Polymer Handbook $3^{rd}$ Edition (Brandup, J., and Immergut. E. H. Eds) Wiley: New York, 1989 p II/53. Such monomers include those with the general formula (12):

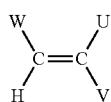

(12)

where U and W are independently selected from the group consisting of —CO$_2$H, —CO$_2$R$^2$, —COR$^2$, —CSR$^2$, —CSOR$^2$, —COSR$^2$, —CONH$_2$, —CONHR$^2$, —CONR$^2$$_2$, hydrogen, halogen and optionally substituted C$_1$-C$_4$ alkyl wherein the substituents are independently selected from hydroxy, —CO$_2$H, —CO$_2$R$^1$, —COR$^2$, —CSR$^2$, —CSOR$^2$, —COSR$^2$, —CN, —CONH$_2$, —CONHR$^2$, —CONR$^2$$_2$, —OR$^2$, —SR$^2$, —O$_2$CR$^2$, —SCOR$^2$, and —OCSR$^2$; and V is selected from hydrogen, R$^2$, —CO$_2$H, —CO$_2$R$^2$, —COR$^2$, —CSR$^2$, —CSOR$^2$, —COSR$^2$, —CONH$_2$, —CONHR$^2$, —CONR$^2$$_2$, —OR$^2$, —SR$^2$, —O$_2$CR$^2$, —SCOR$^2$, and —OCSR$^2$;

where R$^2$ is selected from optionally substituted C$_1$-C$_{18}$ alkyl, optionally substituted C$_2$-C$_{18}$ alkenyl, optionally substituted aryl, optionally substituted heteroaryl, optionally substituted carbocyclyl, optionally substituted heterocyclyl, optionally substituted aralkyl, optionally substituted heteroarylalkyl, optionally substituted alkaryl, optionally substituted alkylheteroaryl and polymer chains wherein the substituents are independently selected from the group consisting of alkyleneoxidyl (epoxy), hydroxy, alkoxy, acyl, acyloxy, formyl, alkylcarbonyl, carboxy, sulfonic acid, alkoxy- or aryloxy-carbonyl, isocyanato, cyano, silyl, halo, amino, including salts and derivatives thereof. Preferred polymer chains include, but are not limited to, polyalkylene oxide, polyarylene ether and polyalkylene ether.

Examples of such monomers include, but are not limited to, maleic anhydride, N-alkylmaleimide, N-arylmaleimide, dialkyl fumarate and cyclopolymerisable monomers, acrylate and methacrylate esters, acrylic and methacrylic acid, styrene, acrylamide, methacrylamide, and methacrylonitrile, mixtures of these monomers, and mixtures of these monomers with other monomers.

Specific examples of useful ethylenically unsaturated monomers include the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylamino styrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropylacrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, ethylene and chloroprene. This list is not exhaustive.

An important feature according to the method of the present invention is that polymerisation of the ethylenically unsaturated monomer gives rise to the water swellable polymer layer and the extensible polymer layer.

To provide for the water swellable polymer layer, the method therefore comprises polymerising a monomer composition that includes ionisable ethylenically unsaturated monomer. As discussed above, this water swellable polymer layer is in fact a base responsive water swellable RAFT polymer layer that encapsulates the particulate material.

By being "base responsive water swellable" is meant that the RAFT polymer layer can, upon being exposed to a basic aqueous environment, swell with water and expand in volume. The swelling function of this polymer layer at least in part stems from the basic aqueous environment ionising the polymerised ionisable ethylenically unsaturated monomer residue that forms part of the RAFT polymer.

Provided that the water swellable polymer layer can be triggered to swell upon being exposed to a basic aqueous environment, there is no particular limitation concerning the base that may be used to render the aqueous environment basic. Examples of bases that may be used for this purpose include alkali metal bases such as NaOH, KOH, Na$_2$CO$_3$ and NaHCO$_3$, ammonium hydroxide (e.g. NH$_3$ in water), alkaline earth metal bases such as Ca(OH)$_2$ or lower aliphatic (e.g. C1-C4) amines such as trimethyl amine and triethyl amine.

In some embodiments, it may be desirable to use a volatile base to trigger swelling of the swellable polymer layer. By the term "volatile" base is meant that the base is capable of evaporating from the polymer encapsulated particulate material and/or the aqueous dispersion thereof. An example of a suitable volatile base includes ammonia (i.e. as ammonium hydroxide when present in the aqueous phase).

By being a "RAFT polymer" layer is meant that the monomer composition that gives rise to the water swellable polymer layer is polymerised under the control of the RAFT agent.

The water swellable polymer layer also "encapsulates" the particulate material. By the water swellable polymer layer being in a form that "encapsulates" the particulate material is meant that the polymer substantially surrounds or coats the entire particulate material.

By the term "ionisable" ethylenically unsaturated monomer is meant ethylenically unsaturated monomer that comprises one or more functional groups that can be ionised to form cationic or anionic groups. Such functional groups will generally be capable of being ionised under acidic or basic conditions through loss or acceptance of a proton. The ionisable functional groups will generally be an acid group or a basic group. For example, a carboxylic acid functional group may form a carboxylate anion under basic conditions, and an amine functional group may form a quaternary ammonium cation under acidic conditions. The functional groups may also be capable of ionised through an ion exchange process.

Conversely, by the term "non-ionisable" ethylenically unsaturated monomer is meant that the monomer does not comprise an ionisable functional group. In particular, such monomers do not comprise acid groups or basic groups which can loose or accept a proton under acidic or basic conditions.

In order to form the base responsive water swellable RAFT polymer layer, those skilled in the art will appreciate that the ionisable ethylenically unsaturated monomer used in accordance with the invention will comprise functional groups which can be ionised to form anionic groups, such as ethylenically unsaturated monomers comprising ionisable acid functional groups.

In one embodiment, the ionisable ethylenically unsaturated monomer is ethylenically unsaturated monomer comprising one or more ionisable acid functional groups.

The use of ionisable ethylenically unsaturated monomer to form base responsive water swellable polymer is known in the art. The base responsive water swellable RAFT polymer layer formed in accordance with the invention can advantageously be prepared using similar monomer compositions to those used in preparing conventional base responsive water swellable polymers.

Those skilled in the art will appreciate that the amount of ionisable ethylenically unsaturated monomer that is to be used to prepare the base responsive water swellable RAFT polymer layer can vary depending upon the nature of the ionisable monomer and also the nature of any co-monomer if present. For example, the water swellable polymer layer may be formed by polymerising a monomer composition comprising ionisable and non-ionisable ethylenically unsaturated monomer. In order to obtain the water swellable properties of the polymer layer it may be that less ionisable ethylenically unsaturated monomer can be used if it is copolymerised with hydrophilic non-ionisable ethylenically unsaturated monomer relative to being polymerised with hydrophobic non-ionisable ethylenically unsaturated monomer. Those skilled in the art will be able to tailor the monomer composition comprising the ionisable ethylenically unsaturated monomer accordingly so as to form a suitable base responsive water swellable RAFT polymer layer.

Generally, the monomer composition that is polymerised to form the water swellable polymer layer will comprise at least about 3 wt %, or at least 5 wt %, or at least 10 wt % of ionisable ethylenically unsaturated monomer such as ethylenically unsaturated monomer comprising one or more ionisable acid functional groups.

By providing the water swellable polymer layer with a higher ionisable ethylenically unsaturated monomer (e.g. ethylenically unsaturated monomer comprising one or more ionisable acid functional groups) content, the layer can have a greater capacity to swell, and thereby less polymer can be employed to afford a given void volume.

In one embodiment, the monomer composition that is polymerised to form the water swellable polymer layer comprises methyl methacrylate (MMA), butyl acrylate (BA) and methacrylic acid (MA) and/or acrylic acid (AA), for example in a 1 (MA):1(BA):1 (MA and/or AA) weight ratio. If a combination of methacrylic acid and acrylic acid is employed, the combined mass of the two acids is to be used in calculating the required weight ratio.

Those skilled in the art will be able to select suitable hydrophilic, hydrophobic, ionisable, and non-ionisable ethylenically unsaturated monomers for use in accordance with the invention.

Examples of hydrophilic ethylenically unsaturated monomers include, but are not limited to, acrylic acid, methacrylic acid, hydroxyethyl methacrylate, hydroxypropyl methacrylate, acrylamide and methacrylamide, hydroxyethyl acrylate, N-methylacrylamide, dimethylaminoethyl methacrylate, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid.

Examples of hydrophilic ethylenically unsaturated monomers which have ionisable acid functional groups include, but are not limited to, methacrylic acid, acrylic acid, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid.

Examples of non-ionisable hydrophilic ethylenically unsaturated monomers include, but are not limited to, hydroxy ethyl methacrylate, hydroxy propyl methacrylate, and hydroxy ethyl acrylate.

Examples of (non-ionisable) hydrophobic ethylenically unsaturated monomers include, but are not limited to, styrene, alpha-methyl styrene, butyl acrylate, butyl methacrylate, amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, vinyl butyrate, vinyl tert-butyrate, vinyl stearate and vinyl laurate.

Polymerisation of the ethylenically unsaturated monomer also comprises polymerising a monomer composition that includes non-ionisable ethylenically unsaturated monomer so as to form an extensible, water and base permeable RAFT polymer layer that encapsulates the water swellable polymer layer.

The hydrophobic ethylenically unsaturated monomers will generally be relatively insoluble in the aqueous phase used in accordance with the invention, whereas the hydrophilic ethylenically unsaturated monomers will generally be relatively soluble in the aqueous phase used in accordance with the invention.

By being a "RAFT polymer" layer is meant that the monomer composition that gives rise to the water extensible polymer layer is polymerised under the control of the RAFT agent.

The extensible polymer layer also "encapsulates" the water swellable polymer layer. By the extensible polymer layer being in a form that "encapsulates" the water swellable polymer layer is meant that the polymer substantially surrounds or coats the entire water swellable polymer layer.

As described herein, the function of the extensible layer is to first encapsulate the water swellable polymer layer in its non-swollen state and then stretch to accommodate the volume expansion of the water swellable polymer layer in its swollen state. Upon dehydration of the swollen polymer layer, the extensible polymer layer is to remain in a stretched state so as to promote formation of one or more voids between the particulate material and the extensible polymer layer.

The extensible polymer layer is also base and water permeable. Such properties are of course required to enable base and water to penetrate this layer to interact with and promote swelling of the water swellable polymer layer.

The base and water permeable properties of the extensible polymer layer may be attained by any suitable means. Those skilled in the art will be able to select a suitable monomer composition to provide the extensible polymer layer with a sufficient degree of water and base permeability to function as required in the present invention. For example, a person skilled in the art will appreciate that the nature of the extensible polymer may vary depending on the type of base that is to be used to trigger swelling of the swellable polymer layer.

Thus, the monomer composition that is polymerised to form the extensible polymer layer may comprise hydrophilic ethylenically unsaturated monomer which can impart some hydrophilic character to the layer and facilitate transportation of base and water therethrough. Such a composition may be useful where a fixed or non volatile base such as NaOH is being used.

Generally, the monomer composition that is polymerised to form the extensible polymer layer will comprise a majority of hydrophobic ethylenically unsaturated monomer (e.g. greater than about 50 wt %, greater than about 70 wt %, greater than about 80 wt %, or greater than about 90 wt %). The hydrophobic ethylenically unsaturated monomer will generally be non-ionisable.

In a similar manner to that discussed above in respect of the water swellable polymer layer, the amount (if present) of hydrophilic ethylenically unsaturated monomer that is polymerised to facilitate base and water permeability properties of the extensible polymer layer may vary depending upon the nature of the hydrophilic ethylenically unsaturated monomers and also on the nature of any hydrophobic ethylenically unsaturated comonomers they are polymerised with it.

Generally, the monomer composition that is polymerised to form the extensible polymer layer will comprise no more than about 10 wt %, no more than about 7 wt %, no more than about 5 wt %, or no more than about 3 wt % of hydrophilic ethylenically unsaturated monomer such as ionisable ethylenically unsaturated monomer (e.g. ethylenically unsaturated monomer comprising ionisable acid functional groups).

Unlike the water swellable polymer layer, the extensible polymer layer will generally not have water swellable properties. In other words, the extensible polymer layer will generally be substantially non water-swellable. By being "substantially non water-swellable" is meant that while the extensible polymer layer is water permeable, water is not retained within the layer to an extent that results in an appreciable expansion of its volume.

Accordingly, the polymer composition that is polymerised to form the extensible polymer layer will generally be formulated such that it does not contain an amount of ionisable ethylenically unsaturated monomer that would provide the resulting polymer with base responsive water swellable properties.

In the context of the extensible polymer layer, the term "extensible" is extended to mean that the polymer layer is capable of stretching to accommodate within its confines an expanded volume of the water swellable polymer layer when in a swollen state.

In addition to being extensible, the extensible polymer layer, when in its stretched state due to accommodating the expanded volume of the water swellable polymer layer, should also be capable of being maintained in a stretched state upon dehydration of the swollen polymer layer. In particular, by the extensible polymer layer being maintained in a stretched state (i.e. presenting an internal perimeter that is larger than the internal perimeter of the layer in its unstretched state), a reduction in the volume of the swollen polymer layer due to dehydration can promote formation of one or more voids in between the particulate material and the extensible polymer layer. When in the stretched state, the extensible polymer layer will preferably resist deformation so as to avoid collapse of the one or more voids formed upon dehydration of the swellable polymer layer.

Those skilled in the art will be able to prepare suitable monomer compositions that give rise to the required properties of the extensible polymer layer. For example, as discussed above the base and water permeability of the polymer layer may be derived through use of hydrophobic ethylenically unsaturated monomer optionally in conjunction with hydrophilic ethylenically unsaturated monomer.

The extensible properties of the polymer layer may be derived through selection of monomers that give rise to a (co)polymer having an appropriate glass transition temperature (Tg). Those skilled in the art will appreciate that monomers selected to form a particular polymer will influence its Tg. The "Tg" is in a range of temperature over which an amorphous polymer (or the amorphous regions in a partially crystalline polymer) change from a relatively hard and brittle state to a relatively soft, viscous or rubbery state. The Tg of the extensible polymer layer can therefore be conveniently tailored through selection of appropriate monomers.

Tg values referred to herein are calculated, and those relating to a copolymer are calculated in accordance with the Fox equation $(1/Tg=W_a/Tg_{(a)}+W_b/Tg_{(b)}+ \ldots$ (where $W_a$ is the weight fraction of monomer a, $W_b$ is the weight fraction of monomer b ... )).

In one embodiment, the monomer composition that is polymerised to form the extensible polymer layer provides for an extensible polymer layer having a Tg of greater than about 50° C., or greater than about 60° C., or greater than about 70° C.

The Tg of the extensible polymer layer can advantageously be tailored to assist with attaining both the ability for the layer to stretch and also be maintained in a stretched state. For example, swelling of the water swellable polymer layer may be conducted at a temperature above the Tg of the extensible polymer layer, thereby providing the extensible polymer layer with a greater ability to stretch. The resulting polymer encapsulated particulate material with the swollen polymer layer and the stretched extensible polymer layer may then be cooled to a temperature below the Tg of the extensible polymer layer, thereby providing the extensible polymer layer with a greater ability to resist deformation. Dehydration of the swollen polymer layer at temperatures below the Tg of the extensible polymer layer can in turn facilitate formation of one or more voids between the particulate material and the extensible polymer layer with little or no deformation of the extensible polymer layer.

In one embodiment, the monomer composition that is polymerised to form the extensible polymer layer consists essentially of styrene.

In another embodiment, the monomer composition that is polymerised to form the extensible polymer layer comprises styrene, methyl methacrylate and butyl acrylate, for example in a weight ratio of about 60:40:5.

General techniques and equipment used in performing conventional emulsion and mini-emulsion polymerisations can advantageously be employed in performing the method of the invention.

Those skilled in the art will appreciate that in order to form the water swellable polymer layer that encapsulates the particulate material, and the extensible polymer layer that encapsulates the water swellable polymer layer, polymerisation of the appropriate monomer compositions will necessarily occur sequentially. Thus, the monomer composition that gives rise to the water swellable polymer layer will be polymerised before the monomer composition that gives rise to the extensible polymer layer. These monomer compositions may be polymerised in separate discrete polymerisation reactions or may form part of a sequential continuous polymerisation process.

Generally, the polymerisation of monomers to form the polymer encapsulated particulate material will be conducted in an aqueous medium having a pH that is sufficiently acidic (e.g. at a pH of less than 7, or less than 6 or less than 5, or at about 4) so as to promote little if no swelling of the so formed water swellable polymer layer. In particular, swelling of the water swellable polymer layer will generally be performed as a separate step after the polymer encapsulated particulate material in accordance with the invention is prepared.

The method in accordance with the invention will generally be performed in semi-continuous or continuous modes.

Semi-continuous and continuous modes of operation offer superior control over polymer architecture together with control over polymer polydispersity. According to these modes of operation, monomer may be added gradually or in stages thereby enabling different monomers and additives to be introduced during the course of the polymerisation reaction. As the solid content of the dispersion increases during polymerisation, the resulting polymer encapsulated particulate material may require further stabilisation. In that case, additional RAFT agent may also be added to the reaction with the monomer in order to replenish the surface of the growing polymer particles with RAFT stabilising moieties.

By "semi-continuous" is meant that the method is conducted batch wise and monomer is added gradually or in stages throughout the polymerisation. By "continuous" is meant that the method is performed in a loop type reactor whereby all reagents are continuously added gradually or in stages throughout the polymerisation and product is continuously removed from the reaction system. Generally, the method will be performed in a semi-continuous mode.

An example of performing the method of the invention in a semi-continuous mode might comprise introducing a selected particulate material and RAFT agent to an aqueous phase in a reaction vessel to provide for a stable dispersion of the particulate material throughout the continuous aqueous phase. A thermal initiator may also be added, along with any other reagents if required, for example buffers to regulate pH. Typically, all reagents used are essentially free from dissolved oxygen and the reaction solution is purged with an inert gas, such as nitrogen, prior to initiating the polymerisation. The dispersion temperature may then be increased so that the initiator undergoes thermally induced homolytic scission. A monomer composition that will provide for the water swellable polymer layer may then be introduced and polymerisation of the monomer composition can proceed under the control of the RAFT agent. The addition of monomer at this stage may be maintained at a rate to avoid reservoir monomer droplets from forming, and can be continued at such a rate until sufficient monomer has been polymerised under the control of the RAFT agent to render it, if it was not already, essentially non-labile from surface of the particulate material. Further monomer can then be added at a greater rate either continually or in stages until the desired degree of polymerisation has occurred so as to form the water swellable polymer layer that encapsulates the particulate material. The polymerisation process is then continued under the control of the RAFT agent by introducing a monomer composition that gives rise to the extensible polymer layer possibly in conjunction with additional thermal initiator. Again the monomer may be introduced continually or in stages until the desired degree of polymerisation has occurred to form the extensible polymer layer encapsulates the water swellable polymer layer.

Where the polymer encapsulated particulate material prepared in accordance with the invention is to be used as a precursor in the formation of vesiculated polymer particles, it will generally be an important consideration that the extensible polymer layer be capable of being maintained in a stretched state, and in that state resist deformation during dehydration of the swollen polymer layer so as to facilitate formation of the void region in the vesiculated polymer particles.

As discussed above, the Tg of the extensible polymer layer can be advantageously tailored to afford the extensible polymer layer with such properties. However, it may, for example, be desirable to use a monomer composition that gives rise to an extensible polymer layer having a Tg that does not afford the extensible polymer layer with adequate ability to maintain its stretched state and/or resist defamation in that stretched state (e.g. where the polymer layer has a quite low Tg). In that case, it may be desirable to introduce a degree of crosslinking into the extensible polymer layer. Introducing a degree of crosslinking into the extensible polymer layer will generally have the effect of rendering the layer less extensible and more resistant to deformation. Accordingly, it will be appreciated that such crosslinking will typically be introduced when the layer is already in a stretched state (i.e. when the water swellable polymer layer is in a swollen state).

It may also be desirable to introduce a degree of crosslinking into the extensible polymer layer irrespective of its Tg.

Accordingly, in one embodiment the method of the invention further comprises crosslinking the stretched extensible, water and base permeable RAFT polymer layer that accommodates within its confines the expanded volume of the swollen base responsive water swellable RAFT polymer layer.

Crosslinking of the stretched extensible polymer layer may be achieved by any suitable means known to those skilled in the art. In particular, those skilled in the art will appreciate that crosslinked polymer structures may be derived in a number of ways through use of polymerised ethylenically unsaturated monomers. For example, multi-ethylenically unsaturated monomers can afford a crosslinked polymer structure through polymerisation of at least two unsaturated groups to provide a crosslink. In that case, the crosslinked structure is typically derived during polymerisation and provided through a free radical reaction mechanism.

Alternatively, the crosslinked polymer structure may be derived from ethylenically unsaturated monomers which also contain a reactive functional group that is not susceptible to taking part in free radical reactions (i.e. "functionalised" unsaturated monomers). In that case, the monomers are incorporated into the polymer backbone through polymerisation of the unsaturated group, and the resulting pendant functional group provides means through which crosslinking may occur. By utilising monomers that provide complementary pairs of reactive functional groups (i.e. groups that will react with each other), the pairs of reactive functional groups can react through non radical reaction mechanisms to provide crosslinks. Formation of such crosslinks may occur during or after polymerisation of the monomers.

A variation on using complementary pairs of reactive functional groups is where the monomers are provided with non-complementary reactive functional groups. In that case, the functional groups will not react with each other but instead provide sites which can subsequently be reacted with a crosslinking agent to form the crosslinks. It will be appreciated that such crosslinking agents will be used in an amount to react with substantially all of the non-complementary reactive functional groups. Formation of the crosslinks under these circumstances will generally be induced after polymerisation of the monomers.

A combination of these methods of forming a crosslinked polymer structure may be used.

The terms "multi-ethylenically unsaturated monomers" and "functionalised unsaturated monomers" mentioned above can conveniently and collectively also be referred to herein as "crosslinking ethylenically unsaturated monomers" or "crosslinking monomers". By the general expression "crosslinking ethylenically unsaturated monomers" or "crosslinking monomers" is meant an ethylenically unsaturated monomer through which a crosslink is or will be derived. Accordingly, a multi-ethylenically unsaturated monomer will typically afford a crosslink during polymerisation, whereas a functionalised unsaturated monomer can provide means through which a crosslink can be derived either during or after polymerisation. It will be appreciated that not all unsaturated monomers that contain a functional group will be used in accordance with the invention for the purpose of functioning as a crosslinking monomer. For example, acrylic acid should not be considered as a crosslinking monomer unless it is used to provide a site through which a crosslink is to be derived.

Examples of suitable multi-ethylenically unsaturated monomers that may be selected to provide the crosslinked polymer structure include, but are not limited to, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol(meth)acrylamide, triallylamine, oleyl maleate, glyceryl propoxy triacrylate, allyl methacrylate, methacrylic anhydride and methylenebis(meth)acrylamide.

Examples of suitable ethylenically unsaturated monomers which contain a reactive functional group that is not susceptible to taking part in free radical reactions include, but are not limited to, acetoacetoxyethyl methacrylate, glycidyl methacrylate, N-methylolacrylamide, (isobutoxymethyl)acrylamide, hydroxyethyl acrylate, t-butyl-carbodiimidoethyl methacrylate, acrylic acid, γ-methacryloxypropyltriisopropoxysilane, 2-isocyanoethyl methacrylate and diacetone acrylamide.

Examples of suitable pairs of monomers mentioned directly above that provide complementary reactive functional groups include N-methylolacrylamide and itself, (isobutoxymethyl)acrylamide and itself, γ-methacryloxypropyltriisopropoxysilane and itself, 2-isocyanoethyl methacrylate and hydroxyethyl acrylate, and t-butyl-carbodiimidoethyl methacrylate and acrylic acid.

Examples of suitable crosslinking agents that can react with the reactive functional groups of one or more of the functionalised unsaturated monomers mentioned above include, but are not limited to, amines such as hexamethylene diamine, ammonia, methyl amine, ethyl amine, Jeffamines™ and diethylene triamine, melamine, trimethylolpropane tris (2-methyl-1-aziridine propionate) and adipic bishydrazide. Examples of pairs of crosslinking agents and functionalised unsaturated monomers that provide complementary reactive groups include hexamethylene diamine and acetoacetoxyethyl methacrylate, amines such as hexamethylene diamine, ammonia, methyl amine, ethyl amine, Jeffamines™ and diethylene triamine and glycidyl methacrylate, melamine and hydroxyethyl acrylate, trimethylolpropane tris(2-methyl-1-aziridine propionate) and acrylic acid, adipic bishydrazide and diacetone acrylamide.

For avoidance of any doubt, reference herein to "crosslinking" the stretched extensible polymer layer is intended to mean that polymer chains that make up the stretched extensible polymer layer are crosslinked.

Those skilled in the art will appreciate that by being a RAFT polymer the extensible polymer layer will comprise active RAFT functional groups that may participate in further free radical reactions. These RAFT agents may therefore take part in or mediate to some extent reaction with the aforementioned crosslinking monomers.

Upon forming the aqueous dispersion of polymer encapsulated particulate material in accordance with the invention, the water swellable layer of the polymer encapsulated particulate material may be triggered to swell with water by exposing the polymer encapsulated particulate material to a basic aqueous environment. This will generally be done by simply introducing a suitable base to the aqueous dispersion and optionally heating the dispersion.

Upon forming the resulting swollen polymer encapsulated particulate material, if desired the method of the invention may further comprise a step of crosslinking the stretched extensible polymer layer as herein described.

The aqueous dispersion of swollen polymer encapsulated particulate material can advantageously be used in a number of applications, including water borne coating products.

Aqueous dispersions of polymer particles are used extensively in water borne products such as paints, adhesives, fillers, primers, liquid inks and sealants. Such products also typically comprise other formulation components such as pigments, extenders, film forming aids and other additives, all present at different levels and in different combinations.

The use of pigments in such products is important not only in providing "hiding" power to the product but also to enable the products to be provided in a variety of colours.

Pigments have traditionally been incorporated in waterborne products by adding the pigments to a preformed aqueous dispersion of polymer particles and dispersing them with the assistance of dispersing agents. Alternatively, pigments are dispersed with the aid of dispersing agents in an initial stage to form what is termed a millbase, and then this millbase is blended with a preformed aqueous dispersion of polymer particles. The dispersion step requires high agitation speeds in order to impart shear on the pigment particles. This dispersion step can sometimes be problematic because conventional aqueous dispersions of polymer particles are not always stable at the levels of shear exerted during pigment dispersion.

In many applications where such pigmented products are used, agglomeration of pigment particles, in the product per se and also during curing of the product, can adversely effect properties such as the products gloss, scrub/stain resistance, flow, mechanical properties, opacity, colour and/or colour strength. Whilst being particularly desirable, reducing or avoiding detrimental agglomeration of pigment particles in such products has to date been difficult to achieve using conventional technology.

The polymer encapsulated particulate material in accordance with the invention can advantageously function as an opacifier in the aforementioned water borne coating products and therefore enable the pigment content of the products to be reduced. By incorporating particulate material within the polymer particles as herein described, the polymer encapsulated particulate material in accordance with the invention can also be used to minimise, if not eliminate, problems such as pigment agglomeration in such products.

As discussed above, dehydration of the swollen polymer encapsulated particulate material in accordance with the invention provides for vesiculated polymer particles comprising the particulate material within their void region. Such vesiculated polymer particles can advantageously exhibit enhanced opacifying properties over conventional vesiculated polymer particles. In the context of water borne coating products, the vesiculated polymer particles can simply be formed by formulating the products with the aforementioned swollen polymer encapsulated particulate material, applying the coating product as required and allowing water within the swollen polymer encapsulated particulate material to evaporate.

Providing the extensible polymer layer with a relatively high Tg (e.g. greater than about 50° C., or greater than about 60° C., or greater than about 70° C.) can facilitate separation of the so formed polymer encapsulated particulate material from the aqueous phase in which it is prepared. The polymer encapsulated particulate material can then be dried and subsequently used as an additive in waterborne or solventborne coating compositions. For example, the isolated polymer encapsulated particulate material can be dispersed in a waterborne coating composition to impart opacifying properties to the composition.

The polymer encapsulated particulate material in accordance with the invention is of course not limited to use in water borne coating applications.

The invention therefore also provides a method of preparing a paint, filler, adhesive, liquid ink, primer or sealant product comprising preparing an aqueous dispersion of polymer encapsulated particulate material in accordance with the invention, and combining the dispersion with one or more formulation components.

Those skilled in the art will have an understanding of suitable formulation components that may be included in paints, fillers, adhesives, liquid ink, primers or sealants products. Example of such formulation components include, but are not limited to, thickness, antifungal agents, UV absorbers, extenders and tinting agents.

The invention further provides a paint, filler, adhesive, primer or sealant product comprising an aqueous dispersion of polymer encapsulated particulate material in accordance with the invention.

The polymer encapsulated particulate material in accordance with the invention is believed to be unique in its own right and represents a further aspect of the invention.

Thus, there is also provided polymer encapsulated particulate material, that particulate material being encapsulated by a base responsive water swellable RAFT polymer layer comprising polymerised residue of ionisable ethylenically unsaturated monomer, wherein the base responsive water swellable RAFT polymer layer is encapsulated by an extensible, water and base permeable RAFT polymer layer that comprises polymerised residue of non-ionisable ethylenically unsaturated monomer.

The polymer encapsulated particulate material can advantageously be prepared in a variety of sizes, but will generally be 20 microns or less in size. The polymer encapsulated particulate material may also be 12 microns or less, 7 microns or less, or 2 microns or less in size. The size of the polymer encapsulated particulate material may also be in sub-micron range, for example from 0.01 to 1 micron.

For avoidance of any doubt, reference to the "size" of the polymer encapsulated particulate materials is that of the average largest dimension provided by the combination of the polymer coating and the particulate material. The water swellable polymer layer will generally encapsulate the particulate material in a substantially uniform continuous coating, and the extensible polymer layer will generally encapsulate the water swellable polymer layer in a substantially uniform and continuous coating. By a "substantially uniform and continuous coating" is meant that the coating does not present in an irregular manner and that the coating is substantially free of holes or voids. In this context, it will be appreciated that reference to the coating being substantially "free of holes or voids" is intended to be a reference to at least the water swellable polymer layer that has not undergone swelling and subsequent dehydration so as to provide for the vesiculated polymer particles described herein.

To achieve the substantially uniform continuous coating of the layers, the thickness of the layers will generally be relatively constant. However, it may be that the thickness of one or both of the encapsulating polymer layers vary gradually around the perimeter of the particulate material. For example, the particulate material may not be located at the precise centre of a spherical polymer coating. An assessment of the uniformity, continuity, and thickness of the polymer layers will generally be made visually, for example by TEM.

While there is no particular limitation as to the thickness of the water swellable polymer layer that encapsulates the particulate material or the extensible polymer layer that encapsulates the water swellable polymer layer, the layers will generally have a thickness that enables them to function in the manner described herein. Thus, the water swellable polymer layer will generally have a thickness that enables it to swell and deswell to afford a void region between the particulate material and the stretched extensible polymer layer, and the extensible polymer layer will generally have a thickness that enables it to be stretched and yet maintain within its stretched confines the expanded volume of the swellable polymer layer when in its swollen state.

As an example only, the swellable polymer layer, when in its non-swollen state, may have average thickness of at least 2 nm, or at least 5 nm, or at least 10 nm, or at least 20 nm, or at least 40 nm, or at least 50 nm.

As an example only, the extensible polymer layer, when in its non-stretched state, may have average thickness of at least 50 nm, or at least 80 nm, or at least 100 nm.

Those skilled in the art will appreciate that the thickness of the swellable and extensible polymer layers will in practice be a function of the amount of monomer added during the method of the invention. The swellable polymer is the layer that can ultimately form a void within the polymer encapsulated material. In order to maximise the impact of the void on the scattering of light by the core particle it is desirable to minimise the amount of water swellable polymer used to achieve a void of given volume.

The swellable polymer can represent no more than about 15%, for example no more than about 10%, of the combined mass of the swellable and extensible polymer layers.

The extensible polymer layer can represent at least 85%, for example at least 90%, of the combined mass of the swellable and extensible polymer layers.

The thickness/mass of the respective layers can be controlled by simply adjusting the amount of the respective monomer compositions polymerised according to the method of the invention.

In one embodiment, the polymer encapsulated particulate material in accordance with the invention will not comprise polymer layers other than the water swellable polymer layer and the extensible polymer layer.

RAFT agents of general formula (1) may be prepared by any suitable means. Generally, such RAFT agents will be prepared by polymerising ethylenically unsaturated monomer under the control of a RAFT agent of general formula (13):

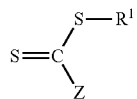
(13)

where Z and $R^1$ are as previously defined.

When preparing RAFT agents of general formula (1) from RAFT agents of general formula (13), it will be important to bear in mind that RAFT agents of general formula (1) must not only be capable of functioning as a RAFT agent in the polymerisation of ethylenically unsaturated monomer but also as a stabiliser to stabilise the particulate material in the continuous aqueous phase. RAFT agents of general formula (13) may in their own right be capable of exhibiting some surface activity, however as previously discussed such agents will generally not have an ability to function as stabiliser to the extent required in accordance with the invention and will therefore be required to undergo reaction with ethylenically unsaturated monomer in order to form the "—(X)$_n$—" feature to afford RAFT agents of general formula (1) as herein described.

Having said this, when n=0 in connection with general formula (1), it is to be understood that such a compound inherently possesses sufficient surface activity to function as a stabiliser for the particulate material in accordance with the invention. In that case, general formula (1) is equivalent to general formula (13).

Ethylenically unsaturated monomers suitable for use in preparing compounds of general formula (1) can be any monomer that may be polymerised by a free radical process and include those ethylenically unsaturated monomers herein described. As previously discussed, such monomers would generally be selected for their hydrophilic, hydrophobic, ionisable or non-ionisable qualities.

Examples of RAFT agents of general formula (13) include, but are not limited to those agents represented by the following general formulae (14) to (23):

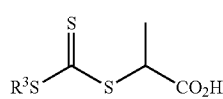
(14)

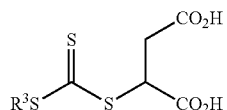
(15)

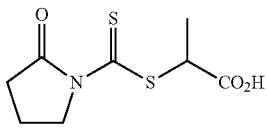
(16)

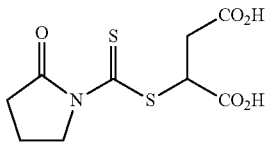
(17)

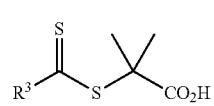
(18)

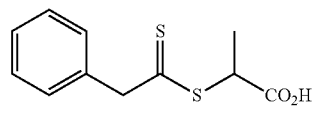
(19)

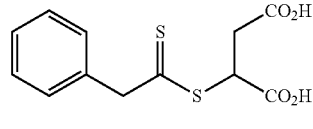
(20)

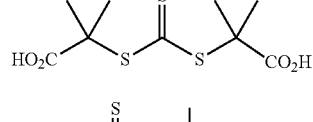
(21)

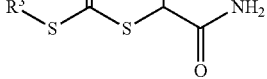
(22)

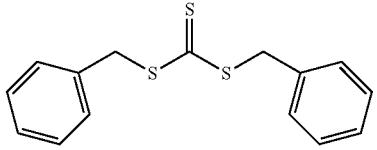
(23)

wherein $R^3$ is as previously defined.

In one embodiment, the RAFT agent of general formula (13) used to prepare RAFT agents of general formula (1) is a trithiocarbonyl RAFT agent.

As used herein, the term "alkyl", used either alone or in compound words denotes straight chain, branched or cyclic alkyl, preferably $C_{1-20}$ alkyl, e.g. $C_{1-10}$ or $C_{1-6}$. Examples of straight chain and branched alkyl include methyl, ethyl, n-propyl, isopropyl, n-butyl, sec-butyl, t-butyl, n-pentyl, 1,2-dimethylpropyl, 1,1-dimethyl-propyl, hexyl, 4-methylpentyl, methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as "propyl", butyl" etc, it will be understood that this can refer to any of straight, branched and cyclic isomers where appropriate. An alkyl group may be optionally substituted by one or more optional substituents as herein defined.

The term "alkenyl" as used herein denotes groups formed from straight chain, branched or cyclic hydrocarbon residues containing at least one carbon to carbon double bond including ethylenically mono-, di- or polyunsaturated alkyl or cycloalkyl groups as previously defined, preferably $C_{2-20}$ alkenyl (e.g. $C_{2-10}$ or $C_{2-6}$). Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substituents as herein defined.

As used herein the term "alkynyl" denotes groups formed from straight chain, branched or cyclic hydrocarbon residues containing at least one carbon-carbon triple bond including ethylenically mono-, di- or polyunsaturated alkyl or cycloalkyl groups as previously defined. Unless the number of carbon atoms is specified the term preferably refers to $C_{2-20}$ alkynyl (e.g. $C_{2-10}$ or $C_{2-6}$). Examples include ethynyl, 1-propynyl, 2-propynyl, and butynyl isomers, and pentynyl isomers. An alkynyl group may be optionally substituted by one or more optional substituents as herein defined.

The term "halogen" ("halo") denotes fluorine, chlorine, bromine or iodine (fluoro, chloro, bromo or iodo). Preferred halogens are chlorine, bromine or iodine.

The term "aryl" (or "carboaryl") denotes any of single, polynuclear, conjugated and fused residues of aromatic hydrocarbon ring systems. Unless the number of carbon atoms is specified the term preferably refers to $C_{6-18}$ aryl (e.g. $C_{6-12}$). Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Preferred aryl include phenyl and naphthyl. An aryl group may or may not be optionally substituted by one or more optional substituents as herein defined. The term "arylene" is intended to denote the divalent form of aryl.

The term "carbocyclyl" includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-6-membered, or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl. A carbocyclyl group may be optionally substituted by one or more optional substituents as herein defined. The term "carbocyclylene" is intended to denote the divalent form of carbocyclyl.

The term "heterocyclyl" when used alone or in compound words includes any of monocyclic, polycyclic, fused or conjugated hydrocarbon residues, preferably $C_{3-20}$ (e.g. $C_{3-10}$ or $C_{3-8}$) wherein one or more carbon atoms are replaced by a heteroatom so as to provide a non-aromatic residue. Suitable heteroatoms include O, N, S, P and Se, particularly O, N and S. Where two or more carbon atoms are replaced, this may be by two or more of the same heteroatom or by different heteroatoms. The heterocyclyl group may be saturated or partially unsaturated, i.e. possess one or more double bonds. Particularly preferred heterocyclyl are 5-6 and 9-10 membered heterocyclyl. Suitable examples of heterocyclyl groups may include aziridinyl, oxiranyl, thiiranyl, azetidinyl, oxetanyl, thietanyl, 2H-pyrrolyl, pyrrolidinyl, pyrrolinyl, piperidyl, piperazinyl, morpholinyl, indolinyl, imidazolidinyl, imidazolinyl, pyrazolidinyl, thiomorpholinyl, dioxanyl, tetrahydrofuranyl, tetrahydropyranyl, tetrahydropyrrolyl, tetrahydrothiophenyl, pyrazolinyl, dioxalanyl, thiazolidinyl, isoxazolidinyl, dihydropyranyl, oxazinyl, thiazinyl, thiomorpholinyl, oxathianyl, dithianyl, trioxanyl, thiadiazinyl, dithiazinyl, trithianyl, azepinyl, oxepinyl, thiepinyl, indenyl, indanyl, 3H-indolyl, isoindolinyl, 4H-quinolazinyl, chromenyl, chromanyl, isochromanyl, pyranyl and dihydropyranyl. A heterocyclyl group may be optionally substituted by one or more optional substituents as herein defined. The term "heterocyclylene" is intended to denote the divalent form of heterocyclyl.

The term "heteroaryl" includes any of monocyclic, polycyclic, fused or conjugated hydrocarbon residues, wherein one or more carbon atoms are replaced by a heteroatom so as to provide an aromatic residue. Preferred heteroaryl have 3-20 ring atoms, e.g. 3-10. Particularly preferred heteroaryl are 5-6 and 9-10 membered bicyclic ring systems. Suitable heteroatoms include, O, N, S, P and Se, particularly O, N and S. Where two or more carbon atoms are replaced, this may be by two or more of the same heteroatom or by different heteroatoms. Suitable examples of heteroaryl groups may include pyridyl, pyrrolyl, thienyl, imidazolyl, furanyl, benzothienyl, isobenzothienyl, benzofuranyl, isobenzofuranyl, indolyl, isoindolyl, pyrazolyl, pyrazinyl, pyrimidinyl, pyridazinyl, indolizinyl, quinolyl, isoquinolyl, phthalazinyl, 1,5-naphthyridinyl, quinoxalinyl, quinazolinyl, quinolinyl, oxazolyl, thiazolyl, isothiazolyl, isoxazolyl, triazolyl, oxadialzolyl, oxatriazolyl, triazinyl, and furazanyl. A heteroaryl group may be optionally substituted by one or more optional substituents as herein defined. The term "heteroarylene" is intended to denote the divalent form of heteroaryl.

The term "acyl" either alone or in compound words denotes a group containing the moiety C=O (and not being a carboxylic acid, ester or amide) Preferred acyl includes $C(O)—R^e$, wherein $R^c$ is hydrogen or an alkyl, alkenyl, alkynyl, aryl, heteroaryl, carbocyclyl, or heterocyclyl residue. Examples of acyl include formyl, straight chain or branched alkanoyl (e.g. $C_{1-20}$) such as acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g.

naphthylacetyl, naphthylpropanoyl and naphthylbutanoyl]; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. The $R^e$ residue may be optionally substituted as described herein.

The term "sulfoxide", either alone or in a compound word, refers to a group —S(O)$R^f$ wherein $R^f$ is selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl.

The term "sulfonyl", either alone or in a compound word, refers to a group S(O)$_2$—$R^f$, wherein $R^f$ is selected from hydrogen, alkyl, alkenyl, alkynyl, aryl, heteroaryl, heterocyclyl, carbocyclyl and aralkyl. Examples of preferred $R^f$ include $C_{1-20}$alkyl, phenyl and benzyl.

The term "sulfonamide", either alone or in a compound word, refers to a group S(O)N$R^f R^f$ wherein each $R^f$ is independently selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl. In a preferred embodiment at least one $R^f$ is hydrogen. In another form, both $R^f$ are hydrogen.

The term, "amino" is used here in its broadest sense as understood in the art and includes groups of the formula N$R^a R^b$ wherein $R^a$ and $R^b$ may be any independently selected from hydrogen, alkyl, alkenyl, alkynyl, aryl, carbocyclyl, heteroaryl, heterocyclyl, arylalkyl, and acyl. $R^a$ and $R^b$, together with the nitrogen to which they are attached, may also form a monocyclic, or polycyclic ring system e.g. a 3-10 membered ring, particularly, 5-6 and 9-10 membered systems. Examples of "amino" include NH$_2$, NHalkyl (e.g. $C_{1-20}$alkyl), NHaryl (e.g. NHphenyl), NHaralkyl (e.g. NHbenzyl), NHacyl (e.g. NHC(O)$C_{1-20}$alkyl, NHC(O)phenyl), Nalkylalkyl (wherein each alkyl, for example $C_{1-20}$, may be the same or different) and 5 or 6 membered rings, optionally containing one or more same or different heteroatoms (e.g. O, N and S).

The term "amido" is used here in its broadest sense as understood in the art and includes groups having the formula C(O)N$R^a R^b$, wherein $R^a$ and $R^b$ are as defined as above. Examples of amido include C(O)NH$_2$, C(O)NHalkyl (e.g. $C_{1-20}$alkyl), C(O)NHaryl (e.g. C(O)NHphenyl), C(O)NHaralkyl (e.g. C(O)NHbenzyl), C(O)NHacyl (e.g. C(O)NHC(O)$C_{1-20}$alkyl, C(O)NHC(O)phenyl), C(O)Nalkylalkyl (wherein each alkyl, for example $C_{1-20}$, may be the same or different) and 5 or 6 membered rings, optionally containing one or more same or different heteroatoms (e.g. O, N and S).

The term "carboxy ester" is used here in its broadest sense as understood in the art and includes groups having the formula CO$_2 R^g$, wherein $R^g$ may be selected from groups including alkyl, alkenyl, alkynyl, aryl, carbocyclyl, heteroaryl, heterocyclyl, aralkyl, and acyl. Examples of carboxy ester include CO$_2 C_{1-20}$alkyl, CO$_2$aryl (e.g. CO$_2$phenyl), CO$_2$aralkyl (e.g. CO$_2$ benzyl).

In this specification "optionally substituted" is taken to mean that a group may or may not be substituted or fused (so as to form a condensed polycyclic group) with one, two, three or more of organic and inorganic groups, including those selected from: alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, haloalkenyl, haloalkynyl, haloaryl, halocarbocyclyl, haloheterocyclyl, haloheteroaryl, haloacyl, haloaryalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheteroayl, nitrocarbocyclyl, nitroacyl, nitroaralkyl, amino (NH$_2$), alkylamino, dialkylamino, alkenylamino, alkynylamino, arylamino, diarylamino, aralkylamino, diaralkylamino, acylamino, diacylamino, heteroclamino, heteroarylamino, carboxy, carboxyester, amido, alkylsulphonyloxy, arylsulphenyloxy, alkylsulphenyl, arylsulphenyl, thio, alkylthio, alkenylthio, alkynylthio, arylthio, aralkylthio, carbocyclylthio, heterocyclylthio, heteroarylthio, acylthio, sulfoxide, sulfonyl, sulfonamide, aminoalkyl, aminoalkenyl, aminoalkynyl, aminocarbocyclyl, aminoaryl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formylalkenyl, formylalkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonylalkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocyclyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate and phosphate groups. Optional substitution may also be taken to refer to where a —CH$_2$— group in a chain or ring is replaced by a group selected from —O—, —S—, —N$R^a$—, —C(O)— (i.e. carbonyl), —C(O)O— (i.e. ester), and —C(O)N$R^a$— (i.e. amide), where $R^a$ is as defined herein.

Preferred optional substituents include alkyl, (e.g. $C_{1-6}$ alkyl such as methyl, ethyl, propyl, butyl, cyclopropyl, cyclobutyl, cyclopentyl or cyclohexyl), hydroxyalkyl (e.g. hydroxymethyl, hydroxyethyl, hydroxypropyl), alkoxyalkyl (e.g. methoxymethyl, methoxyethyl, methoxypropyl, ethoxymethyl, ethoxyethyl, ethoxypropyl etc) alkoxy (e.g. $C_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted e.g., by $C_{1-6}$ alkyl, halo, hydroxy, hydroxy$C_{1-6}$ alkyl, $C_{1-6}$ alkoxy, halo$C_{1-6}$alkyl, cyano, nitro OC(O)$C_{1-6}$ alkyl, and amino); benzyl (wherein benzyl itself may be further substituted e.g., by $C_{1-6}$ alkyl, halo, hydroxy, hydroxy$C_{1-6}$alkyl, $C_{1-6}$ alkoxy, halo$C_{1-6}$ alkyl, cyano, nitro OC(O)$C_{1-6}$ alkyl, and amino), phenoxy (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), benzyloxy (wherein benzyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$alkyl, and amino), amino, alkylamino (e.g. $C_{1-6}$ alkyl, such as methylamino, ethylamino, propylamino etc), dialkylamino (e.g. $C_{1-6}$ alkyl, such as dimethylamino, diethylamino, dipropylamino), acylamino (e.g. NHC(O)$CH_3$), phenylamino (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), nitro, formyl, —C(O)-alkyl (e.g. $C_{1-6}$ alkyl, such as acetyl), O—C(O)-alkyl (e.g. $C_{1-6}$alkyl, such as acetyloxy), benzoyl (wherein the phenyl group itself may be further substituted e.g., by $C_{1-6}$ alkyl, halo, hydroxy hydroxy$C_{1-6}$ alkyl, $C_{1-6}$ alkoxy, halo$C_{1-6}$ alkyl, cyano, nitro OC(O)$C_{1-6}$alkyl, and amino), replacement of $CH_2$ with C=O, $CO_2H$, $CO_2$alkyl (e.g. $C_{1-6}$ alkyl such as methyl ester, ethyl ester, propyl ester, butyl ester), $CO_2$phenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), $CONH_2$, CONHphenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), CONHbenzyl (wherein benzyl itself may be further substituted e.g., by $C_{1-6}$ alkyl, halo, hydroxy hydroxyl $C_{1-6}$ alkyl, $C_{1-6}$ alkoxy, halo $C_{1-6}$ alkyl, cyano, nitro OC(O) $C_{1-6}$ alkyl, and amino), CONHalkyl (e.g. $C_{1-6}$ alkyl such as methyl ester, ethyl ester, propyl ester, butyl amide) CONHdialkyl (e.g. $C_{1-6}$ alkyl)aminoalkyl (e.g., HN$C_{1-6}$ alkyl-, $C_{1-6}$alkylHN—$C_{1-6}$ alkyl- and ($C_{1-6}$ alkyl)$_2$N—$C_{1-6}$ alkyl-), thioalkyl (e.g., HS$C_{1-6}$ alkyl-), carboxyalkyl (e.g., $HO_2CC_{1-6}$ alkyl-), carboxyesteralkyl (e.g., $C_{1-6}$ alkyl$O_2CC_{1-6}$ alkyl-), amidoalkyl (e.g., $H_2N(O)CC_{1-6}$ alkyl-, H($C_{1-6}$ alkyl)N(O) $CC_{1-6}$ alkyl-), formylalkyl (e.g., OHC$C_{1-6}$alkyl-), acylalkyl (e.g., $C_{1-6}$ alkyl(O)C$C_{1-6}$ alkyl-), nitroalkyl (e.g., $O_2NC_{1-6}$ alkyl-), sulfoxidealkyl (e.g., R(O)S$C_{1-6}$ alkyl, such as $C_{1-6}$ alkyl(O)S$C_{1-6}$ alkyl-), sulfonylalkyl (e.g., R(O)$_2$S$C_{1-6}$ alkyl- such as $C_{1-6}$ alkyl(O)$_2$S$C_{1-6}$ alkyl-), sulfonamidoalkyl (e.g., $_2$HRN(O)S$C_{1-6}$ alkyl, H($C_{1-6}$ alkyl)N(O)S$C_{1-6}$ alkyl-).

The term "heteroatom" or "hetero" as used herein in its broadest sense refers to any atom other than a carbon atom which may be a member of a cyclic organic group. Particular examples of heteroatoms include nitrogen, oxygen, sulfur, phosphorous, boron, silicon, selenium and tellurium, more particularly nitrogen, oxygen and sulfur.

For monovalent substituents, terms written as "[group A][group B]" refer to group A when linked by a divalent form of group B. For example, "[group A][alkyl]" refers to a particular group A (such as hydroxy, amino, etc.) when linked by divalent alkyl, i.e. alkylene (e.g. hydroxyethyl is intended to denote HO—$CH_2$—CH—). Thus, terms written as "[group] oxy" refer to a particular group when linked by oxygen, for example, the terms "alkoxy" or "alkyloxy", "alkenoxy" or "alkenyloxy", "alkynoxy" or alkynyloxy", "aryloxy" and "acyloxy", respectively, denote alkyl, alkenyl, alkynyl, aryl and acyl groups as hereinbefore defined when linked by oxygen. Similarly, terms written as "[group]thio" refer to a particular group when linked by sulfur, for example, the terms "alkylthio", "alkenylthio", alkynylthio" and "arylthio", respectively, denote alkyl, alkenyl, alkynyl and aryl groups as hereinbefore defined when linked by sulfur.

As used herein, the term "salt" denotes a species in ionised form, and includes both acid addition and base addition salts. In the context of the present invention, suitable salts are those that do not interfere with the RAFT chemistry.

As used herein, the term "counter anion" denotes a species capable of providing a negative charge to balance the charge of the corresponding cation. Examples of counter anions include, $Cl^-$, $I^-$, $Br^-$, $NO_3^-$, $CN^-$ and $PO_3^-$.

The invention will now be described with reference to the following examples which illustrate some preferred embodiments of the invention. However, it is to be understood that the particularity of the following description is not to supersede the generality of the preceding description of the invention.

EXAMPLES

Example 1

Example 1a

Preparation of a poly-[(4-styrenesulfonic acid)-co-(acrylic acid)] macro-RAFT Agent Containing an Average of 15 Monomer Units Per Chain in a Molar Ratio of 1:2 Using 2-{[(butylsulfanyl)carbonothioyl]sulfanyl}propanoic Acid 2-{[(butylsulfanyl)carbonothioyl]sulfanyl}propanoic acid (1.2 g, 5.03 mmol), 4,4'-azobis(4-cyanovaleric acid) (V501) (0.072 g, 0.43 mmol), acrylic acid (3.63 g, 50.34 mmol), 4-styrenesulfonic acid (5.19 g, 25.17 mmol) in a mixture of dioxane (10.00 g) and water (10.05 g) was prepared in a 50 mL round bottom flask. This was stirred magnetically and sparged with nitrogen for 10 minutes. The flask was then heated at 70° C. for 3 hours under constant stirring. The final copolymer solution had 29.3% solids.

Example 1b

Preparation of Water Swellable Polymer Encapsulated Particulate Material Using the Macro-RAFT Agent from 1a Dispersing the Particulate Material:

In a 100 ml beaker, macro-RAFT solution from Example 1a (1.61 g, 0.27 mmol) was dispersed in water (50 g) to yield a yellow solution of pH 2.22. Ammonia (28% solution in water) was added to the solution to increase the pH to 4.05. Titanium dioxide (Tioxide TR92, Huntsman) (10.04 g) was added to the solution and was thoroughly dispersed using a Vibra-Cell Ultrasonic Processor (Sonics and Materials, Inc.) standard probe at an amplitude of 30% for 5 minutes.

Forming the Water Swellable Layer:

After sonication, the dispersion was transferred to a 100 mL round bottom flask containing 4,4'-azobis(4-cyanovaleric acid) (0.025 g) which was subsequently sealed and purged with nitrogen for 15 min. The whole flask was immersed in an oil bath with a temperature setting of 70° C. A 1:1:1 (weight ratio) solution of methyl methacrylate, butyl acrylate and methacrylic acid (MMA/BA/MA) was prepared and purged with nitrogen for 15 min. 4.73 g of this monomer solution was injected into the macro-RAFT solution, while in the 70° C. oil bath, at a rate of 0.95 g/hour. The solution was allowed to react at 70° C. overnight to form a stable white latex.

Forming the Extensible Polymer Layer:

To this latex, 4,4'-azobis(4-cyanovaleric acid) (0.035 g) was added. The whole flask was sealed, purged with nitrogen for 15 min and re-immersed in an oil bath with a temperature setting of 70° C. Deoxygenated styrene (4.53 g) was injected into the latex at a rate of 0.91 g/hour. The reaction was stopped 6 hours after completion of monomer injection to yield a stable white latex. 4,4'-azobis(4-cyanovaleric acid) (0.037 g) was added to this latex in a round bottom flask which was then sealed and purged with nitrogen for 15 min. The whole flask was re-immersed in an oil bath with a temperature setting of 80° C. Deoxygenated styrene (9.06 g) was injected into the latex, at a rate of 2.27 g/hour and the latex was allowed react overnight. After filtering to remove aggregates, the latex had solid content of 21%.

Swelling the Swellable Polymer Layer:

In a 250 mL round bottom flask, 60.43 g of the latex and 23.84 g of ammonium hydroxide (28%) was dispersed in 62.75 g of water (pH 12). The flask was sealed and subsequently immersed in an oil bath with a temperature setting of 90° C. for 2 hours.

Crosslinking of the Now Stretched Extensible Polymer Layer:

The latex was crosslinked using divinyl benzene (1.02 g, 7.8 mmol) in the presence of 4,4'-azobis(4-cyanovaleric acid) (0.025 g, 0.1 mmol) at 80° C. for 2 hours. After reaction, particles containing titanium dioxide were separated from pure polymer particles (i.e. those not containing titanium dioxide) by centrifugation (4000 rpm, 15 mins, Allegra X22 Centrifuge, Beckman Coulter). The polymer encapsulated particulate material was then redispersed in water (51.83 g) to yield a latex having 14.8% solids with an average diameter of 513 nm, as measured by light scattering (HPPS, Malvern Instruments Ltd).

The polymer encapsulated particulate material in the resulting latex was then analysed by TEM. Sample was prepared by placing 1 drop of an approximately 0.01% dispersion of polymer encapsulated particulate material on a carbon coated TEM grid and allowing it to dry. As a result of this sample preparation process, the water within the swollen water swellable polymer layer is removed, thereby dehydrating this layer and causing a reduction in its volume, which in turn promotes the formation of one or more voids in between the extensible polymer layer and particulate material.

The resulting TEM image clearly showed a void region that had been formed in between the particulate material and the extensible polymer layer.

Example 2

Example 2a

Preparation of a poly-[(4-styrenesulfonic acid)-co-(acrylic acid)-co-(butyl acrylate)] macro-RAFT Agent Containing an Average of 19 Monomer Units Per Chain in a Molar Ratio of 5:10:4 Using 2-{[(butylsulfanyl)carbonothioyl]sulfanyl}propanoic Acid 2-{[(butylsulfanyl)carbonothioyl]sulfanyl}propanoic acid (1.2 g, 5.0 mmol), 4,4'-azobis(4-cyanovaleric acid) (V501) (0.074 g, 0.3 mmol), acrylic acid (3.64 g, 50.5 mmol), 4-styrenesulfonic acid (5.19 g, 25.2 mmol), butyl acrylate (2.64 g, 20.6 mmol) in a mixture of dioxane (10.00 g) and water (10.69 g) was prepared in a 50 mL round bottom flask. This was stirred magnetically and sparged with nitrogen for 10 minutes. The flask was then heated at 70° C. for 12 hours under constant stirring. The final copolymer solution had 34.9% solids.

Example 2b

Preparation of Water Swellable Polymer Encapsulated Particulate Material Using the Macro-RAFT Agent from 2a Dispersing the Particulate Material:

In a 100 ml beaker, macro-RAFT solution from Example 2a (0.82 g, 0.1 mmol) was dispersed in water (50.5 g) to yield a yellow solution of pH 3. Ammonium hydroxide (2.8% solution in water) was added to the macro-RAFT solution to raise the pH to 4.08. Titanium dioxide (Tioxide TR92, Huntsman) (10.05 g) was added to the solution and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.04 g, 0.15 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1 mL, 0.95 g) of methyl methacrylate (MMA), butyl acrylate (BA) and methacrylic acid (MA) was injected into the flask, while in the 70° C. oil bath, at, a rate of 2.5 mL/hour.

Formation of the Extensible Polymer Layer:

After 55 minutes of heating, a deoxygenated monomer solution (5 mL, 4.7 g) of MMA (4.3 g, 42.6 mmol) and BA (0.43 g, 3.3 mmol) was added to the flask at a rate of 2.5 mL/hour while temperature was still maintained at 70° C. Upon completion of this monomer addition, temperature of the oil bath was raised to 85° C. A deoxygenated styrene solution (7.5 mL, 7.04 g, 67.6 mmol) was then injected to the flask at 2.5 mL/hour while the heating was continued for another 18 hours to produce a white and stable latex.

Swelling the Swellable Polymer Layer:

To this latex (61.87 g), water (32.7 g) was added and the pH was adjusted to 11 with ammonium hydroxide (28%). The latex was transferred to a round bottom flask which was subsequently sealed and heated at 95° C. in an oil bath for 2 hours while being magnetically stirred.

Crosslinking the Now Stretched Extensible Polymer Layer:

The latex was subsequently crosslinked using divinyl benzene (1.3 g, 9.7 mmol) in the presence of V501 (0.03 g, 0.15 mmol) at 80° C. for 18 hours. The resulted latex was then centrifuged for 1 hour at 4000 rpm to collect white deposits which were subsequently redispersed in water (51.28 g) by ultrasonication (5 minutes at 30% amplitude). The final latex had 12 0.4% solids and contained particles with an average diameter of 877 nm, as measured by light scattering (HPPS, Malvern Instruments Ltd).

Figure 2:
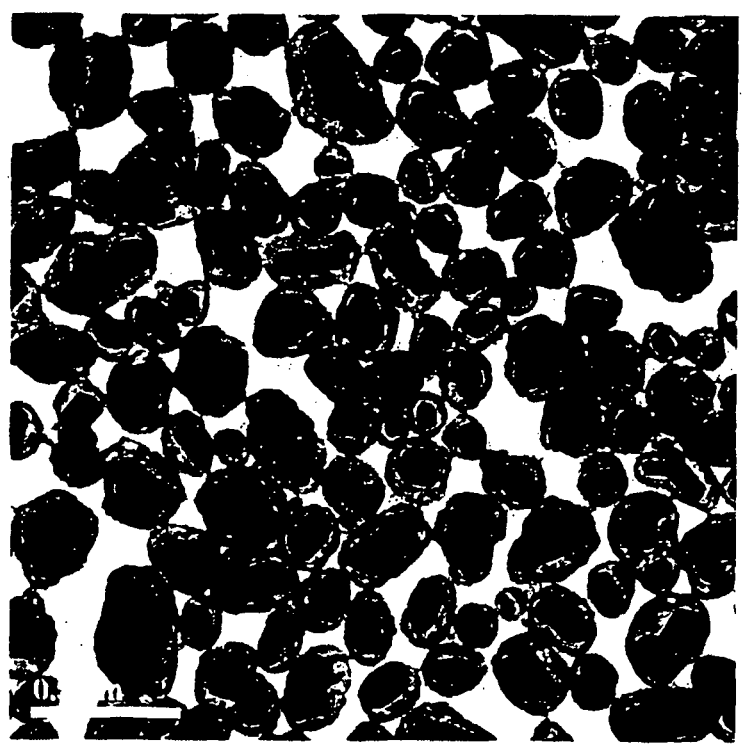
FIG. 2 illustrates a Transmission Electron Microscopy (TEM) image of polymer encapsulated particulate material in accordance with the invention.

The polymer encapsulated particulate material in the resulting latex was then analysed by TEM. The resulting TEM image (see FIG. 2) clearly showed a void region that had been formed in between the particulate material and the extensible polymer layer.

Example 2c

Preparation of Water Swellable Polymer Encapsulated Particulate Material Using the Macro-RAFT Agent from 2a Dispersing the Particulate Material:

In a 100 ml beaker, macro-RAFT solution from Example 2a (0.82 g, 0.1 mmol) was dispersed in water (50.99 g) to yield a yellow solution of pH 2.9. Ammonium hydroxide (2.8% solution in water) was added to the macro-RAFT solution to raise the pH to 4.2. To this solution, titanium dioxide (Tioxide TR92, Huntsman) (9.99 g) was added and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.038 g, 0.14 mmol) which was subsequently sealed and purged with nitrogen for 10 minutes. The whole flask was then immersed in an oil bath with a temperature setting of 70° C. and was magnetically stirred. A deoxygenated 1:1:1 (weight ratio) solution (1.5 mL, 1.42 g) of methyl methacrylate (MMA), butyl acrylate (BA) and methacrylic acid (MA) was injected into the flask, while in the 70° C. oil bath, at a rate of 2.5 mL/hour.

Formation of the Extensible Polymer Layer:

After 60 minutes of heating, a deoxygenated monomer solution (5 mL, 4.7 g) of MMA (4.2 g, 42.2 mmol) and BA (0.47 g, 3.6 mmol) was added to the flask at a rate of 2.5 mL/hour while temperature was still maintained at 70° C. Upon completion of this monomer addition, temperature of the oil bath was raised to 85° C. A deoxygenated styrene solution (5 mL, 4.7 g, 45.0 mmol) was then injected to the flask at 2.5 mL/hour while the heating was continued for another 18 hours to produce a white and stable latex.

Swelling the Swellable Polymer Layer:

After filtering, the pH of the latex was adjusted to 11 with ammonium hydroxide (28%). The latex was transferred to a round bottom flask which was subsequently sealed and heated at 95° C. in an oil bath for 24 hours while was magnetically stirred. After heating, particles containing titanium dioxide were separated from the rest of the latex by centrifugation which was then redispersed in water (50.86 g).

Crosslinking the Now Stretched Extensible Polymer Layer:

The dispersion was subsequently crosslinked using divinyl benzene (0.50 g, 3.9 mmol) in the presence of V501 (0.03 g, 0.13 mmol) at 80° C. for 3 hours. The resulted latex was then centrifuged for 15 minutes at 4000 rpm to collect white deposits which were subsequently redispersed in water (40.5 g) by ultrasonication (5 minutes at 30% amplitude). The final latex had 16.8% solids and contained particles with an average diameter of 644 nm as measured by light scattering (HPPS, Malvern Instruments Ltd).

The polymer encapsulated particulate material in the resulting latex was then analysed by TEM. The resulting TEM image clearly showed a void region that had been formed in between the particulate material and the extensible polymer layer.

Example 2d

Preparation of Water Swellable Polymer Encapsulated Particulate Material Using the Macro-RAFT Agent from 2a Dispersing the Particulate Material:

In a 100 ml beaker, macro-RAFT solution from Example 2a (0.90 g, 0.1 mmol) was dispersed in water (52.4 g) to yield a yellow solution of pH 2.9. Ammonium hydroxide (2.8% solution in water) was added to the macro-RAFT solution to raise the pH to 4.1. To this solution, titanium dioxide (Tioxide TR92, Huntsman) (10.0 g) was added and was thoroughly dispersed using a Vibra-Cell Ultrasonic Processor (Sonics and Materials, Inc.), standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.040 g, 0.14 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1 mL, 0.95 g) of methyl methacrylate (MMA), butyl acrylate (BA) and methacrylic acid (MA) was injected into the flask, while in the 70° C. oil bath, at a rate of 2.5 mL/hour.

Formation of the Extensible Polymer Layer:

After 60 minutes of heating, a deoxygenated monomer solution (5 mL, 4.7 g) of MMA (4.3 g, 42.6 mmol) and BA (0.43 g, 3.3 mmol) was added to the flask at a rate of 2.5 mL/hour while temperature was still maintained at 70° C. Upon completion of this monomer addition, temperature of the oil bath was raised to 85° C. A deoxygenated styrene solution (10 mL, 9.38 g, 90.1 mmol) was then injected to the flask at 4 mL/hour while the heating was continued for another 20 hours to produce a white and stable latex.

Swelling the Swellable Polymer Layer:

After heating, particles containing titanium dioxide were separated from the rest of the latex by centrifugation which was then redispersed in water (51.20 g) by sonication. pH of the latex was adjusted to 11 with ammonium hydroxide (28%). The latex was transferred to a round bottom flask which was sealed and heated at 98° C. in an oil bath for 18 hours while was magnetically stirred.

Crosslinking the Now Stretched Extensible Polymer Layer:

The latex was subsequently crosslinked by divinyl benzene (0.51 g, 3.9 mmol) in the presence of V501 (0.03 g, 0.13 mmol) at 80° C. for 2 hours. The resulted latex was then centrifuged for 30 minutes at 4000 rpm to collect white deposits which were subsequently redispersed in water (40.5 g) by ultrasonication (5 minutes at 30% amplitude). The final latex had 22% solids and contained particles with an average diameter of 653 nm, as measured by light scattering (HPPS, Malvern Instruments Ltd).

The polymer encapsulated particulate material in the resulting latex was then analysed by TEM. The resulting TEM image clearly showed a void region that had been formed in between the particulate material and the extensible polymer layer.

Example 2e

Preparation of Water Swellable Polymer Encapsulated Particulate Material Using the Macro-RAFT Agent from 2a Dispersing the Particulate Material:

In a 100 ml beaker, macro-RAFT solution from Example 2a (0.90 g, 0.1 mmol) was dispersed in water (50.0 g) to yield a yellow solution of pH 2.9. Ammonium hydroxide (2.8% solution in water) was added to the macro-RAFT solution to raise the pH to 4.1. To this solution, titanium dioxide (Tioxide TR92, Huntsman) (10.05 g) was added and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.04 g, 0.15 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1.25 mL, 1.19 g) of methyl methacrylate (MMA), butyl acrylate (BA) and methacrylic acid (MA) was injected into the flask, while in the 70° C. oil bath, at a rate of 2.5 mL/hour.

Formation of the Extensible Polymer Layer:

After 60 minutes of heating, temperature of the oil bath was raised to 85° C. A deoxygenated 1:1 (weight ratio) solution (12.5 mL, 11.55 g) of methyl methacrylate (MMA) (5.78 g, 57.7 mmol) and styrene (5.78 g, 55.5 mmol) solution was then injected to the flask at 2.5 mL/hour while the heating was continued for another 18 hours to produce a white and stable latex.

Swelling the Swellable Polymer Layer:

The pH of the latex was adjusted to 11 using ammonium hydroxide (28%) and was transferred to a round bottom flask which was sealed and heated at 95° C. in an oil bath for 18 hours while was magnetically stirred.

Crosslinking the Now Stretched Extensible Polymer Layer:

The latex was subsequently crosslinked by divinyl benzene (0.51 g, 3.9 mmol) in the presence of V501 (0.03 g, 0.14 mmol) at 80° C. for 4 hours. The resulted latex was then centrifuged for 1 hour at 4000 rpm to collect white deposits which were subsequently redispersed in water (50.0 g) by ultrasonication (5 minutes at 30% amplitude). The final latex had 17.5% solids and contained particles with an average diameter of 624 nm, as measured by light scattering (HPPS, Malvern Instruments Ltd).

The polymer encapsulated particulate material in the resulting latex was then analysed by TEM. The resulting TEM image clearly showed a void region that had been formed in between the particulate material and the extensible polymer layer.

Example 2f

Preparation of Water Swellable Polymer Encapsulated Particulate Material Using the Macro-RAFT Agent from 2a Dispersing the Particulate Material:

In a 100 ml beaker, macro-RAFT solution from Example 2a (0.72 g, 0.11 mmol) was dispersed in water (51.28 g) to yield a yellow solution of pH 2.7. Ammonia (28% solution in water) was added to the solution to raise the pH to 3.9. Titanium dioxide (Tioxide TR92, Huntsman) (10.08 g) was added to the solution and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (0.026 g, 0.1 mmol) which was subsequently sealed and purged with nitrogen for 15 min. The whole flask was immersed in an oil bath with a temperature setting of 70° C. A deoxygenated 1:1:1 (weight ratio) solution (1 mL, 0.95 g) of methyl methacrylate (MMA), butyl acrylate (BA) and methacrylic acid (MA) was injected into the flask, while in the 70° C. oil bath, at a rate of 2.5 mL/hour. The solution was allowed to react at 70° C. overnight to form a stable white latex.

Formation of the Extensible Polymer Layer:

To this latex, 4,4'-azobis(4-cyanovaleric acid) (0.033 g, 0.1 mmol) was added. The whole flask was sealed, purged with nitrogen for 15 min and re-immersed in an oil bath with a temperature setting of 70° C. A deoxygenated 10:1 (weight ratio) solution (10 mL, 9.38 g) of MMA and BA was injected into the latex at a rate of 2.5 mL/hour. The reaction was stopped 1 hour after completion of monomer injection to receive lightly coagulated latex.

Swelling the Swellable Polymer Layer:

After filtering, the resulted latex (2 g) was mixed with water (20 g) and pH of the dispersion was raised to 11. To this latex, sodium hydroxide (0.2 g) was added. The resulting mixture was transferred to a round bottom flask which was then sealed and heated at 95° C. overnight while under stirring.

The polymer encapsulated particulate material in the resulting latex was then analysed by TEM. The resulting TEM image clearly showed a void region that had been formed in between the particulate material and the extensible polymer layer.

Example 2g

Preparation of Water Swellable Polymer Encapsulated Particulate Material Using the Macro-RAFT Agent from 2a Dispersing the Particulate Material:

In a 100 ml beaker, macro-RAFT solution from Example 2a (0.84 g, 0.1 mmol) was dispersed in water (51.2 g) to yield a yellow solution of pH 3.4. Ammonium hydroxide (2.8% solution in water) was added to the macro-RAFT solution to raise the pH to 4.4. To this solution, titanium dioxide (Tioxide TR92, Huntsman) (9.98 g) was added and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.040 g, 0.14 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1.25 mL, 1.2 g) of methyl methacrylate (MMA), butyl acrylate (BA) and acrylic acid (AA) was injected into the flask, while in the 70° C. oil bath, at a rate of 2.5 mL/hour.

Formation of the Extensible Polymer Layer:

After 60 minutes of heating, a deoxygenated monomer solution (5 mL, 4.7 g) of MMA (4.3 g, 42.6 mmol) and BA (0.43 g, 3.3 mmol) was added to the flask at a rate of 2.5 mL/hour while temperature was still maintained at 70° C. Upon completion of this monomer addition, the temperature of the oil bath was raised to 80° C. A deoxygenated styrene solution (7.5 mL, 7.0 g, 67.6 mmol) was then injected to the flask at 2.5 mL/hour while the heating was continued for another 18 hours to produce a white and stable latex.

Swelling the Swellable Polymer Layer:

After heating, particles containing titanium dioxide was separated from 2 g of the latex by centrifugation which was then redispersed in water (10 g) by sonication. pH of the latex was adjusted to 12 with sodium hydroxide (3%). The latex was transferred to a round bottom flask which was sealed and heated at 95° C. in an oil bath for 18 hours while was magnetically stirred. The final latex contained particles with an average diameter of 578 nm, as measured by light scattering (HPPS, Malvern Instruments Ltd).

The polymer encapsulated particulate material in the resulting latex was then analysed by TEM. The resulting TEM image clearly showed a void region that had been formed in between the particulate material and the extensible polymer layer.

Example 2h

Preparation of Water Swellable Polymer Encapsulated Particulate Material Using the Macro-RAFT Agent from 2a Dispersing the Particulate Material In a 50 ml beaker, macro-RAFT solution from Example 2a (0.84 g, 0.1 mmol) was dispersed in water (32.1 g) to yield a yellow solution of pH 3.4. Ammonium hydroxide (2.8% solution in water) was added to the macro-RAFT solution to raise the pH to 4.5. To this solution, superparamagnetic iron oxide dispersion (SR85-162, Sirtex Technology Pty Ltd) (10.12 g, 4.5% $\gamma Fe_2O_3$) was added and was thoroughly dispersed using a Vibra-Cell Ultrasonic Processor (Sonics and Materials, Inc.) standard probe at amplitude of 50% for 20 minutes.

Forming the Water Swellable Layer:

After sonication, the dispersion was transferred to a 50 mL round bottom flask containing 4,4'-azobis(4-cyanovaleric acid) (V501) (0.037 g, 0.13 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (0.5 mL, 0.48 g) of methyl methacrylate (MMA), butyl acrylate (BA) and methacrylic acid (MAA) was injected into the flask, while in the 70° C. oil bath, at a rate of 1 mL/hour.

Formation of the Extensible Polymer Layer:

After 45 minutes of heating, a deoxygenated monomer solution (2.5 mL, 2.4 g) of MMA (2.1 g, 21.3 mmol) and BA (0.21 g, 1.7 mmol) was added to the flask at a rate of 2.5 mL/hour while temperature was still maintained at 70° C. Upon completion of this monomer addition, temperature of the oil bath was raised to 80° C. A deoxygenated styrene solution (2.5 mL, 2.4 g, 2.25 mmol) was then injected to the flask at 2.5 mL/hour while the heating was continued for another 16 hours to produce a stable latex.

Swelling the Swellable Polymer Layer:

After heating, the resulted latex (2 g) was mixed with water (10 g) and pH of the dispersion was raised to 11 using ammonium hydroxide (28%). The whole thing was transferred to a round bottom flask which was then sealed and heated at 95° C. for 18 hours while under stirring.

The polymer encapsulated particulate material in the resulting latex was then analysed by TEM. The resulting TEM image clearly showed a void region that had been formed in between the particulate material and the extensible polymer layer.

Example 3

Example 3a

Preparation of a poly(acrylic acid)$_m$-block-poly{(styrene sulfonic acid)$_x$-co-(acrylic acid)$_y$-co-(butyl acrylate)$_z$} Macro-RAFT Agent with Respective Degrees of Polymerization m≈10, x≈10, y≈10 and z≈8 Using Dibenzyl Trithiocarbonate A solution of dibenzyl trithiocarbonate (0.77 g, 2.6 mmol), 4,4'-azobis(4-cyanovaleric acid) (0.04 g, 0.15 mmol), acrylic acid (1.96 g, 27.1 mmol) in dioxane (10.66 g) was prepared in a 100 mL round bottom flask. This was stirred magnetically and sparged with nitrogen for 15 minutes. The flask was then heated at 70° C. for 2 hrs. At the end of this period, acrylic acid (1.93 g, 26.7 mmol) styrene sulfonic acid (neutralized with sodium hydroxy, 5.46 g, 26.5 mmol), butyl acrylate (2.7 g, 21.1 mmol), 4,4'-azobis(4-cyanovaleric acid) (0.05 g, 0.17 mmol), ammonium hydroxide (25%, 0.05 g) and water (10.48 g) was added to the flask. The mixture was deoxygenated and heating was continued at 70° C. for a further 5 hrs. The copolymer solution had 41.1% solids.

Example 3b

Preparation of Water Swellable Polymer Encapsulated Particulate Material Using the Macro-RAFT Agent from 3a Dispersing the Particulate Material:

In a 100 ml beaker, macro-RAFT solution from Example 3a (1 g, 0.1 mmol) was dispersed in water (55.63 g) to yield a cloudy yellow solution of pH 3.4. Ammonium hydroxide (2.8% solution in water) was added to the macro-RAFT solution to raise the pH to 5.1. To this solution, titanium dioxide (Tioxide TR92, Huntsman) (10.0 g) was added and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.043 g, 0.15 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1 mL, 0.95 g) of methyl methacrylate (MMA), butyl acrylate (BA) and methacrylic acid (MA) was injected into the flask, while in the 70° C. oil bath, at a rate of 2.5 mL/hour. After 60 minutes of heating, a deoxygenated monomer solution (5 mL, 4.7 g) of MMA (4.3 g, 42.6 mmol) and BA (0.4 g, 3.3 mmol) was added to the flask at a rate of 2.5 mL/hour while temperature was still maintained at 70° C.

Formation of the Extensible Polymer Layer:

Upon completion of this monomer addition, temperature of the oil bath was raised to 85° C. A deoxygenated styrene solution (7.5 mL, 7.0 g, 67.6 mmol) was then injected to the flask at 4 mL/hour while the heating was continued for another 19 hours to produce a white and stable latex.

Swelling the Swellable Polymer Layer:

After filtering, the resulted latex (2 g) was mixed with water (20 g) and pH of the dispersion was raised to 11. To this latex, sodium hydroxide (0.2 g) was added. The resulting mixture was transferred to a round bottom flask which was then sealed and heated at 98° C. overnight while under stirring.

The polymer encapsulated particulate material in the resulting latex was then analysed by TEM. The resulting TEM image clearly showed a void region that had been formed in between the particulate material and the extensible polymer layer.

Example 4

Synthesis of poly(methyl methacrylate-co-butyl acrylate-co-styrene) Encapsulated Particulate Material Using Macro-RAFT Agent from 2a. Acrylic Acid was Used in Replacement of Methacrylic Acid. Sodium Hydroxide was Used as a Swelling Base Dispersing the Particulate Material:

In a 100 ml beaker, macro-RAFT solution from Example 2a (0.84 g, 0.1 mmol) was dispersed in water (51.2 g) to yield a yellow solution of pH 3.4. Ammonium hydroxide (2.8% solution in water) was added to the macro-RAFT solution to raise the pH to 4.4. To this solution, titanium dioxide (Tioxide TR92, Huntsman) (9.98 g) was added and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.040 g, 0.14 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1.25 mL, 1.2 g) of methyl methacrylate (MMA), butyl acrylate (BA) and acrylic acid (AA) was injected into the flask, while in the 70° C. oil bath, at a rate of 2.5 mL/hour.

Formation of the Extensible Polymer Layer:

After 60 minutes of heating, a deoxygenated monomer solution (5 mL, 4.7 g) of MMA (4.3 g, 42.6 mmol) and BA (0.43 g, 3.3 mmol) was added to the flask at a rate of 2.5 mL/hour while temperature was still maintained at 70° C. Upon completion of this monomer addition, temperature of the oil bath was raised to 80° C. A deoxygenated styrene solution (7.5 mL, 7.0 g, 67.6 mmol) was then injected to the flask at 2.5 mL/hour while the heating was continued for another 18 hours to produce a white and stable latex.

Swelling the Swellable Polymer Layer:

After heating, particles containing titanium dioxide was separated from 2 g of the latex by centrifugation which was then redispersed in water (10 g) by sonication. pH of the latex was adjusted to 12 with sodium hydroxide (3%). The latex was transferred to a round bottom flask which was sealed and heated at 95° C. in an oil bath for 18 hours while was magnetically stirred.

The final latex contained particles with an average diameter of 578 nm, (HPPS, Malvern Instruments Ltd). Transmission electron microscopy showed that the resulted latex contained polymer encapsulated particulate material.

Example 5

Synthesis of poly(methyl methacrylate-co-butyl acrylate-co-styrene) Encapsulated Particulate (Superparamagnetic Iron Oxide) Material Using Macro-RAFT Agent from 2a Dispersing the Particulate Material:

In a 50 ml beaker, macro-RAFT solution from Example 2a (0.84 g, 0.1 mmol) was dispersed in water (32.1 g) to yield a yellow solution of pH 3.4. Ammonium hydroxide (2.8% solution in water) was added to the macro-RAFT solution to raise the pH to 4.5. To this solution, superparamagnetic iron oxide dispersion (SR85-162, Sirtex Technology Pty Ltd) (10.12 g, 4.5% $\gamma Fe_2O_3$) was added and was thoroughly dispersed using a Vibra-Cell Ultrasonic Processor (Sonics and Materials, Inc.) standard probe at amplitude of 50% for 20 minutes.

Forming the Water Swellable Layer:

After sonication, the dispersion was transferred to a 50 mL round bottom flask containing 4,4'-azobis(4-cyanovaleric acid) (V501) (0.037 g, 0.13 mmol) which was subsequently sealed and purged with nitrogen for 10 minutes. The whole flask was then immersed in an oil bath with a temperature setting of 70° C. and was magnetically stirred. A deoxygenated 1:1:1 (weight ratio) solution (0.5 mL, 0.48 g) of methyl methacrylate (MMA), butyl acrylate (BA) and methacrylic acid (MAA) was injected into the flask, while in the 70° C. oil bath, at a rate of 1 mL/hour.

Formation of the Extensible Polymer Layer:

After 45 minutes of heating, a deoxygenated monomer solution (2.5 mL, 2.4 g) of MMA (2.1 g, 21.3 mmol) and BA (0.21 g, 1.7 mmol) was added to the flask at a rate of 2.5 mL/hour while temperature was still maintained at 70° C. Upon completion of this monomer addition, temperature of the oil bath was raised to 80° C. A deoxygenated styrene solution (2.5 mL, 2.4 g, 2.25 mmol) was then injected to the flask at 2.5 mL/hour while the heating was continued for another 16 hours to produce a stable latex.

Swelling the Swellable Polymer Layer:

After heating, the resulted latex (2 g) was mixed with water (10 g) and pH of the dispersion was raised to 11 using ammonium hydroxide (28%). The whole reaction mixture was transferred to a round bottom flask which was then sealed and heated at 95° C. for 18 hours while under stirring. Transmission electron microscopy showed that the resulted latex contained polymer encapsulated particulate material.

Example 6

Example 6a

Preparation of a poly{(acrylic acid)$_x$-co-(butyl acrylate)$_y$} Macro-RAFT Agent with Respective Degrees of Polymerization x≈40, y≈10 Using Dibenzyl Trithiocarbonate A solution of dibenzyl trithiocarbonate (0.99 g, 3.4 mmol), 4,4'-azobis(4-cyanovaleric acid) (0.06 g, 0.22 mmol), acrylic acid (9.71 g, 134.8 mmol), butyl acrylate (4.32 g, 20.9 mmol) in dioxane (30.86 g) was prepared in a 100 mL round bottom flask. This was stirred magnetically and sparged with nitrogen for 15 minutes. The flask was then heated at 70° C. for 5 hrs. The copolymer solution had 32.8% solids.

Example 6b

Synthesis of Crosslinked poly(methyl methacrylate-co-butyl acrylate-co-styrene) Encapsulated Particulate Material Using Macro-RAFT Agent from 6a

Dispersing the Particulate Material:

In a 100 ml beaker, macro-RAFT solution from Example 6a (1.83 g, 0.1 mmol) was dispersed in water (50.4 g) to yield a cloudy yellow solution of pH 2.4. Ammonium hydroxide (2.8% solution in water) was added to the macro-RAFT solution to raise the pH to 5.1. To this solution, titanium dioxide (Tioxide TR92, Huntsman) (10.4 g) was added and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.042 g, 0.15 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1 mL, 0.95 g) of methyl methacrylate (MMA), butyl acrylate (BA) and methacrylic acid (MA) was injected into the flask, while in the 70° C. oil bath, at a rate of 2.5 mL/hour.

Formation of the Extensible Polymer Layer:

After 60 minutes of heating, a deoxygenated monomer solution (5 mL, 4.7 g) of MMA (4.3 g, 42.6 mmol) and BA (0.4 g, 3.3 mmol) was added to the flask at a rate of 5 mL/hour while temperature was still maintained at 70° C. Upon completion of this monomer addition, temperature of the oil bath was raised to 75° C. A deoxygenated styrene solution (7.5 mL, 7.0 g, 67.6 mmol) was then injected to the flask at 2.5 mL/hour while the heating was continued for another 15 hours to produce a white and stable latex.

Swelling the Swellable Polymer Layer:

After filtering, pH of the resulted latex was raised to 11 with ammonium hydroxide solution (25%). The whole thing was transferred to a round bottom flask which was then sealed and heated at 98° C. overnight while under stirring. Transmission electron microscopy showed that the resulted latex contained polymer encapsulated particulate material.

Example 7

Synthesis of Polystyrene Encapsulated Particulate Material Containing Yellow Bismuth Vanadate Pigment (Irgazin Yellow 2094, Ciba Specialty Chemicals) Using Macro-RAFT Agent from 2a

Dispersing the Particulate Material:

In a 100 ml beaker, macro-RAFT solution from Example 2a (0.50 g, 0.1 mmol) was dispersed in water (50.96 g) to yield a yellow solution of pH 2.9. To this solution, bismuth vanadate yellow pigment (Irgazin yellow 2094, Ciba Specialty Chemicals) (4.54 g) was added and was thoroughly dispersed using a Vibra-Cell Ultrasonic Processor (Sonics and Materials, Inc.) standard probe at an amplitude of 30% for 10 minutes. After sonication, the pH of the dispersion was adjusted to 3.5 using HCl 1M solution.

Forming the Water Swellable Layer:

The dispersion was then transferred to a 100 mL round bottom flask containing 4,4'-azobis(4-cyanovaleric acid) (V501) (0.025 g, 0.1 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (2.5 mL, 2.37 g) of methyl methacrylate (MMA), butyl acrylate (BA) and methacrylic acid (MA) was injected into the flask, while in the 70° C. oil bath, at a rate of 2.5 mL/hour.

Formation of the Extensible Polymer Layer:

After 3 hours of heating, the pigment was separated from the latex by centrifugation. This pigment was subsequently redispersed in 50 g of water using a Vibra-Cell Ultrasonic Processor (Sonics and Materials, Inc.) standard probe at an amplitude of 30% for 10 minutes. The dispersion was again transferred to a 100 mL round bottom flask containing 4,4'-azobis(4-cyanovaleric acid) (V501) (0.027 g, 0.1 mmol) which was subsequently sealed and purged with nitrogen for 10 minutes. Styrene monomer (2.35 g, 22.5 mmol) was added to the flask at a rate of 2.5 mL/hour while temperature was still maintained at 75° C. Upon completion of this monomer addition, the heating was continued for another 3 hours to produce a stable yellow latex.

Swelling the Swellable Polymer Layer:

After filtering, 2 g of the latex was added to 20 g of water and the pH of the diluted latex was adjusted to 11 with ammonium hydroxide (28%). The latex was transferred to a round bottom flask which was subsequently sealed and heated at 95° C. in an oil bath for 5 hours while was magnetically stirred. Transmission electron microscopy showed that the resulted latex contained polymer encapsulated particulate material.

Example 8

Synthesis of Polystyrene Encapsulated Particulate Material Containing Paliotol Gelb Yellow Pigment (BASF) Using Macro-RAFT Agent from 2a

Dispersing the Particulate Material:

In a 100 ml beaker, Paliotol Gelb yellow pigment (5.0 g, BASF) and poly(allylamine hydrochloride) (1 g) was dispersed in water (51 g) to give a yellow dispersion. The pH was adjusted to 9 using ammonium hydroxide (2.8%) and the dispersion was thoroughly dispersed using a Vibra-Cell Ultrasonic Processor (Sonics and Materials, Inc.) standard probe at an amplitude of 30% for 10 minutes. After sonication, the pigment was removed by centrifugation and redispersed again in 50 g of water by mixing to produce a yellow dispersion.

A macro-RAFT solution was prepared by mixing the macro-RAFT solution from 2a (0.60 g, 0.1 mmol) in 31.2 g of water. After the pH was adjusted to 4.2 using ammonium hydroxide (2.8%), the solution was slowly added to the pigment dispersion under constant magnetic stirring. The pH was again adjusted to 5.3 with ammonium hydroxide (2.8%) and the final dispersion was further sonicated for another 10 minutes (30% amplitude) to ensure thorough dispersion of pigment particles.

Forming the Water Swellable Layer:

The dispersion was then transferred to a 100 mL round bottom flask containing 4,4'-azobis(4-cyanovaleric acid) (V501) (0.036 g, 0.1 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (2.5 mL, 2.37 g) of methyl methacrylate (MMA), butyl acrylate (BA) and methacrylic acid (MA) was injected into the flask, while in the 70° C. oil bath, at a rate of 2.5 mL/hour.
Formation of the Extensible Polymer Layer:

After 4 hours of heating, the pigment was separated from the latex by centrifugation. This pigment was subsequently redispersed in 50 g of water using a Vibra-Cell Ultrasonic Processor (Sonics and Materials, Inc.) standard probe at an amplitude of 30% for 10 minutes. The dispersion was again transferred to a 100 mL round bottom flask containing 4,4'-azobis(4-cyanovaleric acid) (V501) (0.027 g, 0.1 mmol) which was subsequently sealed and purged with nitrogen for 10 minutes. Styrene monomer (2.35 g, 22.5 mmol) was added to the flask at a rate of 2.5 mL/hour while temperature was still maintained at 70° C. Upon completion of this monomer addition, the heating was continued for another 17 hours to produce a stable yellow latex.
Swelling the Swellable Polymer Layer:

After filtering, 2 g of the latex was added to 20 g of water and the pH of the diluted latex was adjusted to 11 using ammonium hydroxide (28%). The latex was transferred to a round bottom flask which was subsequently sealed and heated at 95° C. in an oil bath for 1 hour while was magnetically stirred. Transmission electron microscopy showed that the resulted latex contained polymer encapsulated particulate material.

Example 9

Synthesis of Polystyrene Encapsulated Particulate Material Containing Irgazin DPP Scaret EK Pigment (CIBA) Using Macro-RAFT Agent from 2a Dispersing the Particulate Material:

In a 100 ml beaker, a solution containing poly(allylamine hydrochloride) (0.24 g) was prepared in 40 g of water. The solution pH was adjusted to 9.6 by ammonium hydroxide (28%). To this solution, Irgazin DPP red pigment (1.0 g, CIBA) was added and thoroughly dispersed using a Vibra-Cell Ultrasonic Processor (Softies and Materials, Inc.) standard probe at an amplitude of 30% for 10 minutes. After sonication, the pigment was removed by centrifugation and redispersed again in 30.8 g of water by mixing to produce a red dispersion.

A macro-RAFT solution was prepared by mixing the macro-RAFT solution from 2a (0.53 g, 0.1 mmol) in 41.0 g of water. After the pH was adjusted to 5.6 using ammonium hydroxide (2.8%), the solution was slowly added to the pigment dispersion under constant stirring. The dispersion was further sonicated for another 10 minutes (30% amplitude) to ensure thorough dispersion of pigment particles. After sonication, the pigment was removed by centrifugation and redispersed again in 40 g of water containing poly(allylamine hydrochloride) (0.24 g) at pH 9.75 to produce a red dispersion. The pigment was then removed by centrifugation and subsequently redispersed in 40 g of water.

Another macro-RAFT solution was prepared by mixing the macro-RAFT solution from 2a (0.21 g, 0.03 mmol) in 40.5 g of water. After the pH was adjusted to 6.1 using ammonium hydroxide (2.8%), the solution was slowly added to the red pigment dispersion under constant stirring. The dispersion was further sonicated for another 10 minutes (30% amplitude) to ensure thorough dispersion of pigment particles.
Forming the Water Swellable Layer:

The dispersion was then transferred to a 100 mL round bottom flask containing 4,4'-azobis(4-cyanovaleric acid) (V501) (0.029 g, 0.1 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1 mL, 0.95 g) of methyl methacrylate (MMA), butyl acrylate (BA) and methacrylic acid (MA) was injected into the flask, while in the 70° C. oil bath, at a rate of 1 mL/hour.
Formation of the Extensible Polymer Layer:

After 1.5 hours of heating, styrene monomer (4.7 g, 45.0 mmol) was added to the flask at a rate of 2.5 mL/hour while temperature was still maintained at 70° C. Upon completion of this monomer addition, the heating was continued for another 14 hours to produce a stable red latex.
Swelling the Swellable Polymer Layer:

After filtering, 10 g of the latex was added to 10 g of water and the pH of the diluted latex was adjusted to 11 with ammonium hydroxide (28%). The latex was transferred to a round bottom flask which was subsequently sealed and heated at 95° C. in an oil bath for 3 hours while was magnetically stirred. Transmission electron microscopy showed that the resulted latex contained polymer encapsulated particulate material.

Example 10

Synthesis of Polystyrene Polymer Encapsulated Particulate Material Containing COOH Functionalised Multiwall Carbon Nanotubes Using Macro-RAFT Agent from 2a Dispersing the Particulate Material:

In a 100 ml beaker, COOH functionalised multiwall carbon nanotubes (0.01 g, NanoLab) were dispersed in a ammonium hydroxide solution (30 g) at pH 10 to produce a black dispersion. The dispersion was further dispersed using a Vibra-Cell Ultrasonic Processor (Sonics and Materials, Inc.) standard probe at an amplitude of 30% for 10 minutes. A poly(allylamine hydrochloride) (PAH) solution was prepared by dissolving 0.002 g of PAH in 20.06 g of water. The solution pH was adjusted to 10 using ammonium hydroxide (2.8%). After sonication, the carbon nanotube dispersion was slowly added to the PAH solution under constant stirring. The dispersion was further dispersed using a Vibra-Cell Ultrasonic Processor (Sonics and Materials, Inc.) standard probe at an amplitude of 30% for another 10 minutes.

A macro-RAFT solution was prepared by mixing the macro-RAFT solution from 2a (0.1 g, 0.01 mmol) in 23.7 g of water. After the pH was adjusted to 7 using ammonium hydroxide (2.8%), the solution was slowly added to the pigment dispersion under constant stirring. The final dispersion was further sonicated for another 10 minutes (30% amplitude) to ensure thorough dispersion of carbon nanotubes.
Forming the Water Swellable Layer:

The dispersion was then transferred to a 100 mL round bottom flask containing 4,4'-azobis(4-cyanovaleric acid) (V501) (0.026 g, 0.1 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1 mL, 0.95 g) of methyl methacrylate (MMA), butyl acrylate (BA) and methacrylic acid (MA) was injected into the flask, while in the 70° C. oil bath, at a rate of 1 mL/hour. After monomer addition, the heating was continued for another hour to produce a black latex.
Formation of the Extensible Polymer Layer:

After filtration, the latex was transferred to a 100 mL round bottom flask containing 4,4'-azobis(4-cyanovaleric acid)

(V501) (0.026 g, 0.1 mmol) which was subsequently sealed and purged with nitrogen for 10 minutes. Styrene monomer (3.75 g, 36.0 mmol) was added to the flask at a rate of 2 mL/hour while temperature was still maintained at 70° C. Upon completion of this monomer addition, the heating was continued for another 2 hours to produce a stable black latex.

Swelling the Swellable Polymer Layer:

After filtering, 2 g of ammonium hydroxide (28%) was added to 20 g of the latex. It was transferred to a round bottom flask which was subsequently sealed and heated at 95° C. in an oil bath for 2 hour while was magnetically stirred. Transmission electron microscopy showed that the resulted latex contained polymer encapsulated particulate material.

Example 11

Synthesis of Crosslinked poly(methyl methacrylate-co-butyl acrylate-co-styrene) Encapsulated Particulate Material Using Macro-RAFT Agent from 2a Dispersing the Particulate Material:

In a 1 L beaker, macro-RAFT solution from Example 2a (10.83 g, 1.64 mmol) was dispersed in water (554.55 g) to yield a yellow solution of pH 2.97. Ammonium hydroxide (2.5% solution in water) was added to the macro-RAFT solution to raise the pH to 4.54. Titanium dioxide (TiPure R706, DuPont) (132.71 g) was added to the solution and was thoroughly dispersed using a Sonifier 450 (Branson Ultrasonics Corporation) standard probe at an amplitude of 30% for 45 minutes.

Forming the Water Swellable Layer:

After sonication, the dispersion was transferred to a 1 L reaction vessel fitted with a condenser and stirrer blade. The dispersion was purged with nitrogen for 10 minutes before it was immersed in a water bath with a temperature setting of 80° C. Once at temperature, ammonium persulphate (0.45 g, 1.96 mmol) was added. A solution of ammonium persulphate (2.50 g, 10.98 mmol) in water (100.0 g) and ammonia (25% solution in water) (0.75 g, 10.98 mmol) was fed into the vessel over 280 minutes, concurrently with 3 monomer solutions that ran consecutively. The first monomer solution of deoxygenated 1:1:1 (weight ratio) solution (19.89 g) of methyl methacrylate (MMA), butyl acrylate (BA) and methacrylic acid (MA) was fed into the vessel over 40 minutes.

Formation of the Extensible Polymer Layer:

At the conclusion of the monomer feed, a second deoxygenated monomer solution (66.29 g) of MMA (59.66 g, 595.89 mmol) and BA (6.63 g, 51.72 mmol) was fed into the vessel over 120 minutes while the temperature was maintained at 80° C. Upon completion of this monomer addition, the temperature of the water bath was raised to 85° C. A deoxygenated styrene solution (99.48 g, 955.18 mmol) was then fed into the vessel over 120 minutes. At the completion of both the monomer feed and the ammonium persulphate feed, heating was continued for another hour to produce a white and stable latex, and left stirring overnight. The resultant latex was filtered through 40 µm filter silk to yield a latex of pH 4.85.

Swelling the Swellable Polymer Layer:

The pH of the latex was adjusted to 11 with ammonium hydroxide (25%). It was then transferred back to a reaction flask fitted with a condenser and stirrer blade, and heated at 95° C. in a water bath, for 3 hours.

Crosslinking the Now Stretched Extensible Polymer Layer:

The latex was subsequently crosslinked by divinyl benzene (6.60 g, 50.68 mmol) in the presence of ammonium persulphate (0.30 g, 1.31 mmol) at 80° C. for 3 hours. The final latex had 27.63% solids and contained particles with an average 639 nm in size (Zetasizer Nano ZS, Malvern Instruments Ltd).

Example 12

Example 12a

Preparation of a poly(acrylic acid)$_m$-block-poly{(styrene sulfonic acid)$_x$-co-(acrylic acid)$_y$-co-(butyl acrylate)$_z$} Macro-RAFT Agent with Respective Degrees of Polymerization m≈10, x≈10, y≈10 and z≈8 Using Dibenzyl Trithiocarbonate A solution of dibenzyl trithiocarbonate (2.33 g, 8.0 mmol), 4,4'-azobis(4-cyanovaleric acid) (0.083 g, 0.40 mmol), acrylic acid (5.77 g, 80.04 mmol) in polyethylene glycol 200 (PEG 200, Orica Chemicals) (30.32 g) was prepared in a 100 mL round bottom flask. This was stirred magnetically and sparged with nitrogen for 15 minutes. The flask was then heated at 80° C. for 2 hrs. At the end of this period, acrylic acid (5.77 g, 80.04 mmol) styrene sulfonic acid (neutralized with sodium hydroxy, 16.50 g, 80.04 mmol), butyl acrylate (8.21 g, 64.03 mmol), 4,4'-azobis(4-cyanovaleric acid) (0.083 g, 0.40 mmol), ammonium hydroxide (25%, 0.05 g) and water (30.63 g) was added to the flask. The mixture was deoxygenated and heating was continued at 80° C. for a further 5 hrs. The copolymer solution had 38.74% solids.

Example 12b

Synthesis of Crosslinked poly(methyl methacrylate-co-butyl acrylate-co-methacrylic acid) Encapsulated Particulate Material Using Macro-RAFT Agent from 12a Dispersing the Particulate Material:

In a 500 mL beaker, macro-RAFT solution from Example 12a (11.70 g, 0.94 mmol) was dispersed in water (317.88 g) to yield a yellow solution of pH 3.09. Titanium dioxide (Tioxide TR92, Huntsman) (76.04 g) was added to the solution and was thoroughly dispersed using a Sonifier 450 (Branson Ultrasonics Corporation) standard probe at an amplitude of 30% for 45 minutes.

Forming the Water Swellable Layer:

After sonication, the dispersion was transferred to a 2 L reaction vessel fitted with a condenser and stirrer blade. The dispersion was purged with nitrogen for 10 minutes before it was immersed in a water bath with a temperature setting of 80° C. Once at temperature, ammonium persulphate (0.20 g, 0.85 mmol) was added. A solution of ammonium persulphate (1.09 g, 4.77 mmol) in water (43.50 g) and ammonium hydroxide (25%) (0.33 g, 4.77 mmol) was fed into the vessel over 240 minutes, concurrently with 3 monomer solutions that ran consecutively. The first monomer solution of deoxygenated 1:1:1 (weight ratio) solution (8.67 g) of methyl methacrylate (MMA), butyl acrylate (BA) and methacrylic acid (MA) was fed into the vessel over 30 minutes.

Formation of the Extensible Polymer Layer:

At the conclusion of the monomer feed, a second deoxygenated monomer solution (28.83 g) of MMA (25.95 g, 259.22 mmol) and BA (2.88 g, 22.50 mmol) was fed into the vessel over 90 minutes while the temperature was maintained at 80° C. At the conclusion of the second feed, a deoxygenated monomer solution (43.27 g) of MMA (37.22 g, 371.74 mmol), BA (3.89 g, 30.39 mmol) and MA (2.16 g, 25.14 mmol) was then fed into the vessel over 120 minutes. At the completion of both the monomer feed and the ammonium persulphate feed, heating was continued for another hour to produce a white and stable latex, and left stirring overnight. The resultant latex was filtered through 40 µm filter silk to yield a latex of pH 4.43.

Swelling the Swellable Polymer Layer:

The pH of the latex was adjusted to 11.06 with ammonium hydroxide (25%). It was then transferred back to a 2 L reaction flask fitted with a condenser and stirrer blade, and heated at 90° C. in a water bath, for 3 hours.

Crosslinking the Now Stretched Extensible Polymer Layer:

The latex was subsequently crosslinked by divinyl benzene (2.87 g, 22.04 mmol) in the presence of ammonium persulphate (0.13 g, 0.57 mmol) at 80° C. for 3 hours. The final latex had 27.63% solids and contained particles with an average 858 nm in size (Zetasizer Nano ZS, Malvern Instruments Ltd).

Example 12c

Preparation of a Simple Coating Using Polymer Encapsulated Particulate Dispersion from 12b and Measurement of Hiding Power of the Coating A base coating was prepared by mixing the ingredients in Table 1 using slow speed mixing equipment common to the paint development industry. The dispersion under test was added to the base coating in a weight ratio of 55:45, base coating: dispersion, and then thoroughly mixed.

TABLE 1

| Ingredients | Wt (g) |
| --- | --- |
| Add and mix | |
| Styrene - acrylic latex, $T_g$ 0° C. (45.0 wt %) | 409.65 |
| Triton CF-10 | 7.00 |
| Rhodoline DF60 | 2.30 |
| Proxel BD20 | 0.50 |
| Zonyl FSP | 1.20 |
| Ammonium hydroxide (25% solution in water) | 1.45 |
| Premix and add to mixture | |
| Propylene glycol | 55.00 |
| Natrosol Plus | 2.50 |
| Add and mix for 10 minutes | |
| Acrysol ™RM-8W Rheology Modifier | 9.50 |
| Acrysol ™RM-2020 NPR Rheology Modifier | 7.55 |
| Add and mix for 10 minutes | |
| AquaBead 525E-AM | 1.00 |
| Water | 3.40 |

Preparation of Conventional Coating System:

A mill base was prepared from the ingredients in Table 2 using high speed dispersion equipment common to the paint development industry.

TABLE 2

| Ingredients | Wt (g) |
| --- | --- |
| Water | 10.00 |
| Propylene glycol | 4.20 |
| Orotan ™ 731A | 2.50 |
| Triton CF-10 | 0.25 |
| Rhodoline DF60 | 0.25 |
| Acrysol ™RM-2020 NPR Rheology Modifier | 4.00 |
| Teric ® G9A6 | 0.45 |
| Ammonium hydroxide (25% solution in water) | 0.25 |
| Tioxide TR92 | 85.00 |
| Water | 5.00 |

Paints were the prepared by adding the mill base to the ingredients in Table 3 which had previously been combined using slow speed mixing equipment.

TABLE 3

| Ingredients | Wt (g) |
| --- | --- |
| Water | 343.84 |
| Styrene - acrylic latex, $T_g$ 0° C. (45.0 wt %) | 550.0 |
| Proxel BD20 | 0.60 |
| Zonyl FSP | 0.90 |
| Ammonium hydroxide (25% solution in water) | 1.80 |

To this mixture the ingredients in Table 4 were added in the order shown and mixed thoroughly.

TABLE 4

| Ingredients | Wt (g) |
| --- | --- |
| Premix and add to mixture | |
| Propylene glycol | 11.0 |
| Natrosol Plus | 0.5 |
| Add and mix for 10 minutes | |
| Acrysol ™RM-8W Rheology Modifier | 1.9 |
| Acrysol ™RM-2020 NPR Rheology Modifier | 1.54 |
| Add and mix for 10 minutes | |
| AquaBead 525E-AM | 0.20 |
| Water | 0.68 |

Measurement of the Instrumental Opacity of the Prepared Coatings:

The parameter that was tested was the hiding power of the coating, which is indicative of the opacity of the dispersion.

Preparation of the Coatings for Testing:

1. Coatings were draw down on pieces of 100 µm polyester film (Melinex), which had been cleaned with ethanol and placed on a glass board with an ethanol seal, using a 175 µm doctor blade.
2. The films were allowed to dry, in constant conditions of 25° C. and 50% humidity, for 24 hours. Films were then moved to a 50° C. oven and left overnight.
3. The films were taken out of the oven, and 2 sections cut out of each film in areas free from visible defects, of roughly dimensions 4 cm×5 cm. The precise area of the testing section was measured.

Testing the Opacity of the Film:

1. Each testing section was weighed to 0.1 mg. This is the weight of the coating plus the substrate.
2. Using a spectrophotometer, the reflectance of the paint against and black and a white tile was measured, ensuring complete contact between the film and the tiles by using a small amount of water between the Melinex and the tile.
3. The reflectance of the black tile and white tiles was also measured.
4. The coating was completely removed from the Melinex using acetone. Once dry, the bare Melinex sections were reweighed on the same balance. This is the weight of the bare substrate.

Testing the NVC and Pigment Levels of the Coatings:

1. Aluminium dishes were prepared by placing in a 150° C. oven for 30 minutes.
2. The aluminium trays were accurately weighed to 0.1 mg.
3. A gram of coating material was added to the tray and weighed accurately.
4. The trays were then placed in a 150° C. oven for 2 hours.
5. The samples were reweighed.
6. The dishes were then place in a 450° C. muffle furnace for 3 hours.

7. The dishes were then reweighed.
8. Using this information, the NVC, pigment content, PVC and WPL was calculated.

Calculating the Hiding Power:
1. The wet film thickness is calculated using the following equation:

$$T(\text{micrometre}) = \frac{U(\text{mg}) * 10}{A(\text{cm}^2) * (\text{weight solids fraction}) * (WPL)}$$

Where T=wet film thickness
U=weight of coating contained on a square
A=area of square 2. The scatter co-efficient is calculated using the following equation:

$$S(\text{mm}^{-1}) = \frac{1000}{b*T} * \coth^{-1}\left(\frac{1 - a*R_b}{b*R_b}\right)$$

Where:

$$a = 0.5 * \left[R_w + \frac{R_b + W - R_w}{R_b * W}\right]$$

$$b = \sqrt{(a^2 - 1)}$$

$$\coth^{-1} x = \frac{1}{2} * \ln\left[\frac{x+1}{x-1}\right]$$

Where S=scatter co-efficient
T=wet film thickness
$R_b$=reflectance of the film against the black tile
$R_w$=reflectance of the film against the white tile
W=reflectance of white tile 3. The Hiding Power (HP) is calculated using the following formula:

$$HP_{0.98}(m2/L) = \frac{b*S}{\coth^{-1}\left[\frac{\sqrt{[(a + 78.4^{-1})^2 - 0.98]} + 78.4^{-1}}{b}\right]}$$

The HP number that is obtained was then adjusted for the amount of pigment used in the coating. This was done by dividing the HP through by the grams of pigment per liter of coating and multiplying by 100.

This number is an indication of the opacity of the coating.

References:
"Standard Test Method for Hiding Power of Paints by Reflectometry" ASTM D2805-96a.
Mitton P B "Opacity, Hiding Power, and Tinting Strength". In *Pigment Handbook Vol 3, Characterization and Physical relationships*, pp 301-303 (1973).

The conventional coating gave a hiding power of 3.54 $m^2/100$ g of $TiO_2$. The coating prepared in Example 12c gave a hiding power of 5.05 $m^2/100$ g of $TiO_2$.

Example 12d

Method of Drying the Polymer Encapsulated Particulate Dispersion, Reconstitution of the Dried Encapsulated Particulate Material and Evaluation of Hiding Power in a Simple Coating A portion of the dispersion from Example 12b was air dried for three days, and reduced to a free flowing powder using a mortar and pestle, with a non-volatile content of 94.90%. This powder was subsequently able to be re-dispersed in an aqueous ammonium hydroxide solution (4.35%). The dispersion that was obtained had solids of the original dispersion and an average particle size of 701 nm (Zetasizer Nano ZS, Malvern Instruments Ltd). Higher solids levels were able to be obtained using this method.

The dispersion was then made into coating according to the instructions previously detailed in Example 12c, with a measured hiding power of 5.10 $m^2/100$ g of $TiO_2$; a gain of 44.1% over conventional paint. The original dispersion had a hiding power result of 5.05 $m^2/100$ g of $TiO_2$, when made into paint following the same method; a gain of 42.7% over conventional paint.

It can be seen that drying and reconstitution of the dispersion does not negatively impact the gain in optical properties of the dispersion.

Example 13

Example 13a

Synthesis of Crosslinked poly(methyl methacrylate-co-butyl acrylate-co-styrene) Encapsulated Particulate Material Using Macro-RAFT Agent from 2a Dispersing the Particulate Material:
In a 1 L beaker, macro-RAFT solution from Example 2a (10.77 g, 1.64 mmol) was dispersed in water (554.61 g) to yield a yellow solution of pH 2.99. Ammonium hydroxide (2.5% solution in water) was added to the macro-RAFT solution to raise the pH to 4.25. Titanium dioxide (Tioxide TR92, Huntsman) (132.71 g) was added to the solution and was thoroughly dispersed using a Sonifier 450 (Branson Ultrasonics Corporation) standard probe at an amplitude of 30% for 45 minutes.

Forming the Water Swellable Layer:
After sonication, the dispersion was transferred to a 2 L reaction vessel fitted with a condenser and stirrer blade. The dispersion was purged with nitrogen for 10 minutes before it was immersed in a water bath with a temperature setting of 80° C. Once at temperature, ammonium persulphate (0.45 g, 1.96 mmol) was added. A solution of ammonium persulphate (2.50 g, 10.98 mmol) in water (100.0 g) and ammonium hydroxide (25%) (0.75 g, 10.98 mmol) was fed into the vessel over 280 minutes, concurrently with 3 monomer solutions that ran consecutively. The first monomer solution of deoxygenated 1:1:1 (weight ratio) solution (19.89 g) of methyl methacrylate (MMA), butyl acrylate (BA) and methacrylic acid (MA) was fed into the vessel over 40 minutes.

Formation of the Extensible Polymer Layer:
At the conclusion of the monomer feed, a second deoxygenated monomer solution (66.29 g) of MMA (59.66 g, 595.89 mmol) and BA (6.63 g, 51.72 mmol) was fed into the vessel over 120 minutes while the temperature was maintained at 80° C. Upon completion of this monomer addition, the temperature of the water bath was raised to 85° C. A deoxygenated styrene solution (99.48 g, 955.18 mmol) was then fed into the vessel over 120 minutes. At the completion of both the monomer feed and the ammonium persulphate feed, heating was continued for another hour to produce a white, stable latex which was left stirring overnight. The resultant latex was filtered through 40 µm filter silk to yield a latex of pH 3.61.

Swelling the Swellable Polymer Layer:

The pH of the latex was adjusted to 11 with ammonium hydroxide (25%). It was then transferred back to a 2 L reaction flask fitted with a condenser and stirrer blade, and heated at 95° C. in a water bath, for 3 hours.

Crosslinking the Now Stretched Extensible Polymer Layer:

The latex was subsequently crosslinked by divinyl benzene (6.60 g, 50.68 mmol) in the presence of ammonium persulphate (0.30 g, 1.31 mmol) at 80° C. for 3 hours. The final latex had 30.59% solids and contained particles with an average 815 nm in size (Zetasizer Nano ZS, Malvern Instruments Ltd).

Example 13b, 13c, 13d, 13e, 13f, 13g

Synthesis of Crosslinked poly(methyl methacrylate-co-butyl acrylate-co-styrene) Encapsulated Particulate Material Using Macro-RAFT Agent from 2a Dispersing the Particulate Material:

In a 1 L beaker, macro-RAFT solution from Example 2a (10.91 g, 1.64 mmol) was dispersed in water (554.47 g) to yield a yellow solution of pH 2.97. Ammonium hydroxide (2.5% solution in water) was added to the macro-RAFT solution to raise the pH to 4.20. Titanium dioxide (Tioxide TR92, Huntsman) (132.71 g) was added to the solution and was thoroughly dispersed using a Sonifier 450 (Branson Ultrasonics Corporation) standard probe at an amplitude of 30% for 45 minutes.

Forming the Water Swellable Layer:

After sonication, 200.43 g of the dispersion was transferred to a 500 mL round bottom flask which was subsequently sealed and purged with nitrogen for 10 minutes. The whole flask was then immersed in an oil bath with a temperature setting of 80° C. and was magnetically stirred. Once at temperature, ammonium persulphate (0.13 g, 0.56 mmol) was added. A solution of ammonium persulphate (0.72 g, 3.15 mmol) in water (28.71 g) and ammonium hydroxide (25%) (0.21 g, 3.15 mmol) was fed into the vessel over 280 minutes, concurrently with 3 monomer solutions that ran consecutively. The composition of the first monomer solution of methyl methacrylate (MMA), butyl acrylate (BA) and methacrylic acid (MA) can be found in Table 5. This deoxygenated monomer solution was fed into the vessel over 40 minutes.

TABLE 5

| | Feed 1 Composition | | |
|---|---|---|---|
| Example | MA (g) | BA (g) | MMA (g) |
| 13b | 1.90 | 1.68 | 1.17 |
| 13c | 1.90 | 1.55 | 0.77 |
| 13d | 1.15 | 1.01 | 0.71 |
| 13e | 1.29 | 1.05 | 0.53 |
| 13f | 1.31 | 1.62 | 2.31 |
| 13g | 0.95 | 0.95 | 0.95 |

Formation of the Extensible Polymer Layer:

At the conclusion of the monomer feed, a second deoxygenated monomer solution (19.03 g) of MMA (17.13 g, 171.12 mmol) and BA (1.90 g, 14.85 mmol) was fed into the vessel over 120 minutes while the temperature was maintained at 80° C. Upon completion of this monomer addition, the temperature of the water bath was raised to 85° C. A deoxygenated styrene solution (28.56 g, 274.21 mmol) was then fed into the vessel over 120 minutes. At the completion of both the monomer feed and the ammonium persulphate feed, heating was continued for another hour to produce a white, stable latex which was left stirring overnight. The resultant latex was filtered, through 40 µm filter silk, the pH is recorded in Table 6.

Swelling the Swellable Polymer Layer:

The pH of the latex was adjusted to 11 with ammonium hydroxide (25%). It was then transferred back to a 500 mL round bottom flask, which was subsequently sealed and heated at 95° C. in an oil bath for 3 hours with magnetic stirring.

Crosslinking the Now Stretched Extensible Polymer Layer:

The latex was subsequently crosslinked by divinyl benzene (1.89 g, 14.55 mmol) in the presence of ammonium persulphate (0.09 g, 0.39 mmol) at 80° C. for 3 hours. The final latex solids and particle size can be found in Table 6.

TABLE 6

| Example | pH at end of feeds | Final pH | Solids (% wt) | Particle Size (nm) |
|---|---|---|---|---|
| 13a | 3.61 | 9.60 | 30.59 | 815 |
| 13b | 2.72 | 10.66 | 29.33 | 618 |
| 13c | 4.35 | 10.75 | 30.33 | 647 |
| 13d | 3.65 | 10.82 | 30.39 | 546 |
| 13e | 4.19 | 10.83 | 29.48 | 578 |
| 13f | 4.30 | 10.33 | 31.46 | 654 |
| 13g | 4.74 | 10.51 | 30.52 | 575 |

Preparation of Simple Coatings Using Polymer Encapsulated Particulate Dispersions from 13a-g:

The dispersions under test were added to a base coating as described in Example 12c in a weight ratio of 55:45, base coating: dispersion, and then thoroughly mixed. The hiding power of the coatings was subsequently measured and compared to the conventional coating, as described in Example 12c, and the results can be found in Table 7.

TABLE 7

| Example | Hiding Power $HP_{0.98}$ of film $(m^2/L)$ | $TiO_2$ Loading (g/L) | $HP_{0.98}$ per 100 g $TiO_2$ $(m^2/100\ g)$ | $HP_{0.98}$ gain wrt Conventional (%) |
|---|---|---|---|---|
| Conventional | 3.35 | 94.60 | 3.54 | — |
| Coating from 13a | 3.19 | 65.19 | 4.89 | +38.28 |
| Coating from 13b | 3.04 | 55.76 | 5.45 | +53.95 |
| Coating from 13c | 3.19 | 54.86 | 5.82 | +64.38 |
| Coating from 13d | 3.19 | 57.00 | 5.59 | +58.05 |
| Coating from 13e | 3.16 | 56.31 | 5.61 | +58.60 |
| Coating from 13f | 3.03 | 57.04 | 5.31 | +50.10 |
| Coating from 13g | 3.29 | 55.94 | 5.88 | +66.11 |

The results outlined in Table 7 show that all of the samples which contain polymer encapsulated particulate material show enhanced opacity relative to the coating where the white pigment has been dispersed conventionally. Further enhancement in opacity is possible by manipulating the composition of the water swellable polymer layer without changing the composition of the extensible polymer layer.

The invention claimed is:

1. A method of preparing an aqueous dispersion of polymer encapsulated particulate material, the method comprising:
   providing a dispersion of the particulate material in a continuous aqueous phase, the dispersion comprising RAFT agent as a stabiliser for the particulate material;
   polymerising ethylenically unsaturated monomer under the control of the RAFT agent to form polymer at the surface of the dispersed particulate material, thereby providing the aqueous dispersion of polymer encapsulated particulate material;
   wherein polymerisation of the ethylenically unsaturated monomer comprises:
   (a) polymerising a monomer composition that includes ionisable ethylenically unsaturated monomer so as to form a base responsive water swellable RAFT polymer layer that encapsulates the particulate material; and
   (b) polymerising a monomer composition that includes non-ionisable ethylenically unsaturated monomer so as to form an extensible, water and base permeable RAFT polymer layer that encapsulates the base responsive water swellable RAFT polymer layer;
   exposing the resulting polymer encapsulated particulate material to a basic aqueous environment such that the base responsive water swellable RAFT polymer layer swells and expands in volume, while at the same time the extensible, water and base permeable RAFT polymer layer stretches to accommodate within its confines the expanded volume of the swollen base responsive water swellable RAFT polymer layer; and
   removing from the polymer encapsulated particulate material water within the swollen base responsive water swellable RAFT polymer layer, the effect of which causes the volume of that layer to be reduced, wherein the extensible, water and base permeable RAFT polymer layer remains in a stretched state so as to provide one or more voids in between the particulate material and the stretched extensible, water and base permeable RAFT polymer layer.

2. The method according to claim 1, wherein the monomer composition that is polymerised to form a base responsive water swellable RAFT polymer layer comprises at least about 3 wt % ionisable ethylenically unsaturated monomer having ionisable acid functional groups.

3. The method according to claim 1, wherein the monomer composition that is polymerised to form an extensible, water and base permeable RAFT polymer layer comprises at least about 50 wt % of non-ionisable hydrophobic ethylenically unsaturated monomer.

4. The method according to claim 1, wherein the monomer composition that is polymerised to form an extensible, water and base permeable RAFT polymer layer comprises no more than about 10 wt % of hydrophilic ethylenically unsaturated monomer.

5. The method according to claim 1 further comprising crosslinking the so formed stretched extensible, water and base permeable RAFT polymer layer.

6. The method according to claim 1, wherein the RAFT agent that functions as a stabiliser for the particulate material is of general formula (1):

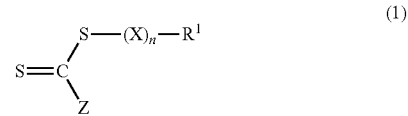

where each X is independently a polymerised residue of an ethylenically unsaturated monomer,
n is an integer ranging from 5 to 100,
$R^1$ is an optionally substituted organic group selected from alkyl, alkenyl, alkynyl, aryl, acyl, carbocyclyl, heterocyclyl, heteroaryl, alkyloxy, alkenyloxy, alkynyloxy, aryloxy, acyloxy, carbocyclyloxy, heterocyclyloxy, heteroaryloxy, alkylthio, alkenylthio, alkynylthio, arylthio, acylthio, carbocyclylthio, heterocyclylthio, heteroarylthio, alkylalkenyl, alkylalkynyl, alkylaryl, alkylacyl, alkylcarbocyclyl, alkylheterocyclyl, alkylheteroaryl, alkyloxyalkyl, alkenyloxyalkyl, alkynyloxyalkyl, aryloxyalkyl, alkylacyloxy, alkylcarbocyclyloxy, alkylheterocyclyloxy, alkylheteroaryloxy, alkylthioalkyl, alkenylthioalkyl, alkynylthioalkyl, arylthioalkyl, alkylacylthio, alkylcarbocyclylthio, alkylheterocyclylthio, alkylheteroarylthio, alkylalkenylalkyl, alkylalkynylalkyl, alkylarylalkyl, alkylacylalkyl, arylalkylaryl, arylalkenylaryl, arylalkynylaryl, arylacylaryl, arylacyl, arylcarbocyclyl, arylheterocyclyl, arylheteroaryl, alkenyloxyaryl, alkynyloxyaryl, aryloxyaryl, arylacyloxy, arylcarbocyclyloxy, aryl heterocyclyloxy, arylheteroaryloxy, alkylthioaryl, alkenylthioaryl, alkynylthioaryl, arylthioaryl, arylacylthio, arylcarbocyclylthio, arylheterocyclylthio, and arylheteroarylthio and
Z is an optionally substituted organic group selected from alkoxy, aryloxy, alkyl, aryl, heterocyclyl, arylalkyl, alkylthio, arylalkylthio, dialkoxy- or diaryloxy- phosphinyl [—P(=O)OR$^2_2$], dialkyl- or diaryl-phosphinyl [—P(=O)OR$^2_2$], acylamino, acylimino, amino, R$_1$—(X)$_n$—S—and a polymer chain, and $R^2$ is selected from alkyl, alkenyl, aryl, heterocyclyl, and alkylaryl.

7. The method according to claim 1, wherein the RAFT agent that functions as a stabiliser for the particulate material is soluble in the continuous aqueous phase.

8. The method according to claim 1, wherein the RAFT agent that functions as a stabiliser for the particulate material is the only stabiliser is the only stabiliser present.

9. The method according to claim 1, wherein the base responsive water swellable RAFT polymer layer is formed by polymerising a monomer composition comprising methyl methacrylate, butyl acrylate and methacrylic acid and/or acrylic acid.

10. The method according to claim 1, wherein the extensible, water and base permeable RAFT polymer layer is formed by polymerising a monomer composition comprising styrene, methyl methacrylate and butyl acrylate.

11. The method according to claim 1, wherein the particulate material is selected from pigment, magnetic material, fullerene, and a combination thereof.

12. The method according to claim 1, wherein the basic aqueous environment is provided by an aqueous solution comprising an alkali metal base, ammonium hydroxide, alkaline earth metal base, C1- C4 aliphatic amine, or combination thereof.

13. Polymer encapsulated particulate material, the particulate material being encapsulated by a base responsive water swellable RAFT polymer layer comprising polymerised residue of ionisable ethylenically unsaturated monomer, wherein (i) the base responsive water swellable RAFT polymer layer is encapsulated by an extensible, water and base permeable RAFT polymer layer that comprises polymerised residue of non-ionisable ethylenically unsaturated monomer, (ii) the base responsive water swellable RAFT polymer layer has been swollen with water to provide for an expanded volume of that layer, and the extensible, water and base permeable RAFT polymer layer has been stretched to accommodate within its confines the expanded volume of the swollen base responsive water swellable RAFT polymer layer, and (iii) water within the swollen base responsive water swellable RAFT polymer layer of the polymer encapsulated particulate material has been removed and the volume of that layer is reduced, while the extensible, water and base permeable RAFT polymer layer remains in a stretched state so as to provide one or more voids in between the particulate material and the stretched, extensible, water and base permeable RAFT polymer layer.

14. A paint, filler, adhesive, primer or sealant product comprising polymer encapsulated particulate material according to claim 13.

15. Polymer encapsulated particular material, the particulate material being encapsulated by base responsive water swellable RAFT polymer layer comprising polymerised residue of ionisable ethylenically unsaturated monomer, and the base responsive water swellable RAFT polymer layer being encapsulated by an extensible, water and base permeable RAFT polymer layer that comprises polymerised residue of non-ionisable ethylenically unsaturated monomer, wherein one or more voids are located between the particulate material and the extensible, water and base permeable RAFT polymer layer.

16. A paint, filler, adhesive, primer or sealant product comprising polymer encapsulated particulate material according to claim 15.

* * * * *